(12) United States Patent
Raymond

(10) Patent No.: US 10,621,140 B2
(45) Date of Patent: Apr. 14, 2020

(54) SYSTEMS AND METHODS FOR IMPROVING THE PERFORMANCE OF A QUANTUM PROCESSOR VIA REDUCED READOUTS

(71) Applicant: D-Wave Systems Inc., Burnaby (CA)

(72) Inventor: Jack Raymond, Vancouver (CA)

(73) Assignee: D-WAVE SYSTEMS INC., Burnaby (CA)

(*) Notice: Subject to any disclaimer, the term of this patent is extended or adjusted under 35 U.S.C. 154(b) by 0 days.

(21) Appl. No.: 16/014,198

(22) Filed: Jun. 21, 2018

(65) Prior Publication Data

US 2018/0300286 A1 Oct. 18, 2018

Related U.S. Application Data

(62) Division of application No. 14/844,876, filed on Sep. 3, 2015, now Pat. No. 10,031,887.

(60) Provisional application No. 62/048,043, filed on Sep. 9, 2014.

(51) Int. Cl.
  *G06F 15/76* (2006.01)
  *G06N 10/00* (2019.01)

(52) U.S. Cl.
  CPC .............. *G06F 15/76* (2013.01); *G06N 10/00* (2019.01)

(58) Field of Classification Search
  CPC ............................. G06N 99/002; G06F 15/76
  See application file for complete search history.

(56) References Cited

U.S. PATENT DOCUMENTS

| | | |
|---|---|---|
| 7,135,701 B2 | 11/2006 | Amin et al. |
| 7,418,283 B2 | 8/2008 | Amin |
| 7,533,068 B2 | 5/2009 | Maassen van den Brink et al. |
| 7,619,437 B2 | 11/2009 | Thom et al. |
| 7,843,209 B2 | 11/2010 | Berkley |
| 7,876,248 B2 | 1/2011 | Berkley et al. |
| 7,898,282 B2 | 3/2011 | Harris et al. |
| 7,969,805 B2 | 6/2011 | Thom et al. |
| 8,008,942 B2 | 8/2011 | van den Brink et al. |
| 8,018,244 B2 | 9/2011 | Berkley |
| 8,035,540 B2 | 10/2011 | Berkley et al. |

(Continued)

FOREIGN PATENT DOCUMENTS

| | | |
|---|---|---|
| WO | 2012/155329 A1 | 11/2012 |
| WO | 2014/123980 A1 | 8/2014 |

OTHER PUBLICATIONS

Blatter et al., "Design aspects of superconducting-phase quantum bits," *Physical Review B* 63(174511):1-9, 2001.

(Continued)

*Primary Examiner* — Feifei Yeung Lopez
(74) *Attorney, Agent, or Firm* — Cozen O'Connor

(57) ABSTRACT

Techniques for improving the performance of a quantum processor are described. The techniques include reading out a fraction of the qubits in a quantum processor and utilizing one or more post-processing operations to reconstruct qubits of the quantum processor that are not read. The reconstructed qubits may be determined using a perfect sampler to provide results that are strictly better than reading all of the qubits directly from the quantum processor. The composite sample that includes read qubits and reconstructed qubits may be obtained faster than if all qubits of the quantum processor are read directly.

15 Claims, 10 Drawing Sheets

(56) References Cited

U.S. PATENT DOCUMENTS

| | | | |
|---|---|---|---|
| 8,098,179 B2 | 1/2012 | Bunyk et al. | |
| 8,169,231 B2 | 5/2012 | Berkley | |
| 8,190,548 B2 | 5/2012 | Choi | |
| 8,195,596 B2 | 6/2012 | Rose et al. | |
| 8,421,053 B2 | 4/2013 | Bunyk et al. | |
| 9,183,508 B2 | 11/2015 | King | |
| 2002/0117656 A1* | 8/2002 | Amin | B82Y 10/00 257/9 |
| 2005/0224784 A1* | 10/2005 | Amin | G06N 10/00 257/14 |
| 2009/0078931 A1 | 3/2009 | Berkley | |
| 2010/0148853 A1* | 6/2010 | Harris | G06N 10/00 327/528 |
| 2011/0089405 A1 | 4/2011 | Ladizinsky et al. | |
| 2011/0231462 A1 | 9/2011 | Macready et al. | |
| 2012/0023053 A1 | 1/2012 | Harris et al. | |
| 2012/0094838 A1 | 4/2012 | Bunyk et al. | |
| 2012/0159272 A1 | 6/2012 | Pesetski et al. | |
| 2013/0278283 A1 | 10/2013 | Berkley | |
| 2014/0223224 A1 | 8/2014 | Berkley | |
| 2015/0032993 A1 | 1/2015 | Amin et al. | |
| 2015/0032994 A1 | 1/2015 | Chudak et al. | |

OTHER PUBLICATIONS

Friedman et al., "Quantum superposition of distinct macroscopic states," *Nature* 406:43-46, Jul. 6, 2000.

Hamze et al., "Systems and Methods for Problem Solving Via Solvers Employing Problem Modification," U.S. Appl. No. 62/040,643, filed Aug. 22, 2014, 80 pages.

Harris et al., "A Compound Josephson Junction Coupler for Flux Qubits With Minimal Crosstalk," arXiv:0904.3784v3, Jul. 16, 2009, 5 pages.

Harris et al., "Experimental Demonstration of a Robust and Scalable Flux Qubit," arXiv:0909.4321v1, Sep. 24, 2009, 20 pages.

Harris et al., "Experimental Investigation of an Eight-Qubit Unit Cell in a Superconducting Optimization Processor," arXiv:1004.1628v2, Jun. 28, 2010, 16 pages.

Il'ichev et al., "Continuous Monitoring of Rabi Oscillations in a Josephson Flux Qubit," *Physical Review Letters* 91(9):1-4, 2003.

Lanting et al., "Systems and Methods for Improving the Performance of a Quantum Processor by Reducing Errors," U.S. Appl. No. 61/858,011, filed Jul. 24, 2013, 45 pages.

Lanting et al., "Systems and Methods for Improving the Performance of a Quantum Processor by Shimming to Reduce Intrinsic/Control Errors," U.S. Appl. No. 62/040,890, filed Aug. 22, 2014, 122 pages.

Makhlin et al., "Quantum-state engineering with Josephson-junction devices," *Reviews of Modern Physics* 73(2):357-400, Apr. 2001.

Mooij et al., "Josephson Persistent-Current Qubit," *Science* 285:1036-1039, Aug. 13, 1999.

Non-Final Rejection, dated Nov. 22, 2017, for U.S. Appl. No. 14/844,876, Raymond, "Systems and Methods for Improving the Performance of a Quantum Processor Via Reduced Readouts," 20 pages.

Orlando et al., "Superconducting persistent-current qubit," *Physical Review B* 60(22):15398-15413, Dec. 1, 1999.

Ranjbar, "Systems and Methods for Problem Solving Via Solvers Employing Post-Processing That Overlaps With Processing," U.S. Appl. No. 62/040,646, filed Aug. 22, 2014, 84 pages.

Ranjbar, "Systems and Methods for Problem Solving Via Solvers Employing Selection of Heuristic Optimizer(s)," U.S. Appl. No. 62/040,661, filed Aug. 22, 2014, 88 pages.

Raymond, "Systems and Methods for Improving the Performance of a Quantum Processor Via Reduced Readouts," U.S. Appl. No. 62/048,043, filed Sep. 9, 2014, 101 pages.

Tavares, "New Algorithms for Quadratic Unconstrained Binary Optimization (Qubo) With Applications in Engineering and Social Sciences," dissertation, Rutgers, The State University of New Jersey, May 2008, 460 pages.

Venugopal et al., "Dynamic Blocking and Collapsing for Gibbs Sampling," arXiv:1309.6870v1, Sep. 1993, 10 pages.

\* cited by examiner

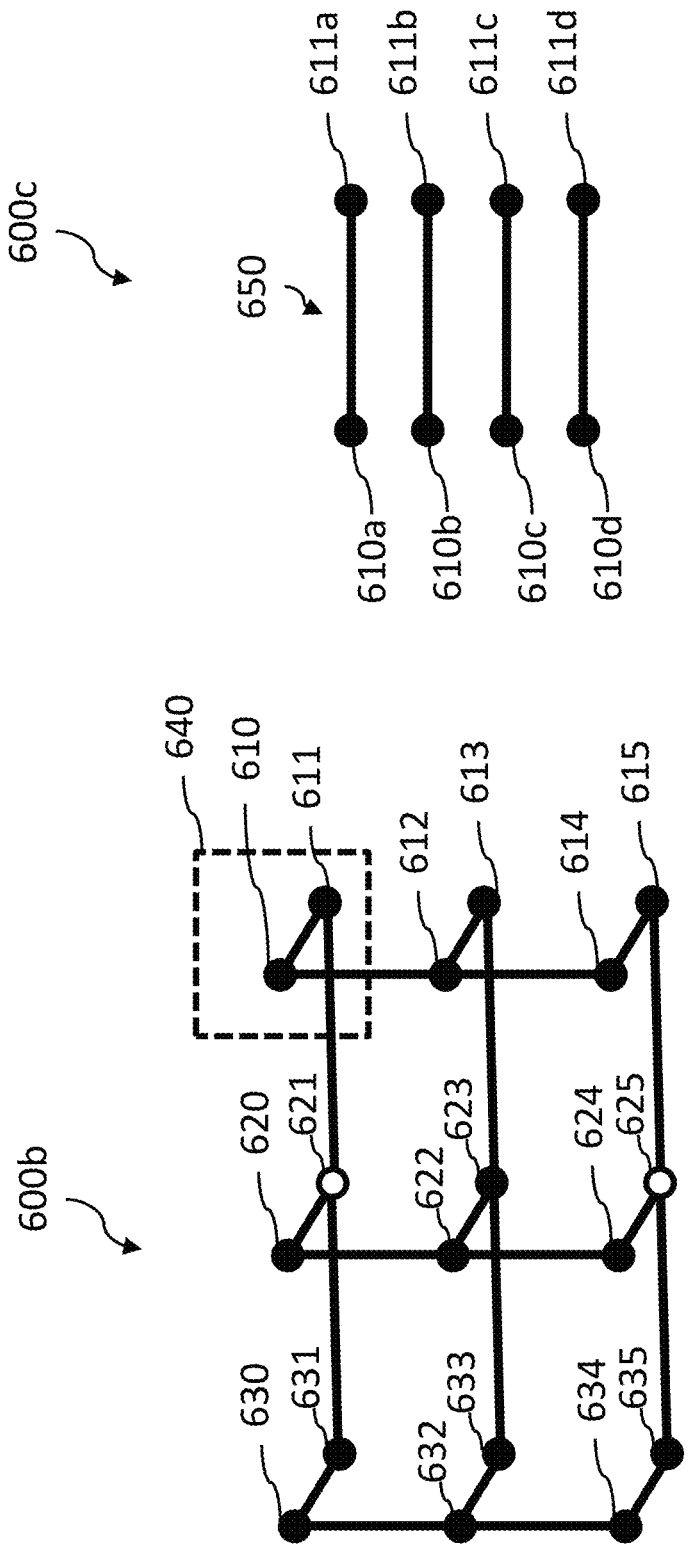

SYSTEMS AND METHODS FOR IMPROVING THE PERFORMANCE OF A QUANTUM PROCESSOR VIA REDUCED READOUTS

BACKGROUND

Field

This disclosure generally relates to computationally solving problems.

Solvers

A solver is a mathematical-based set of instructions executed via hardware that is designed to solve mathematical problems. Some solvers are general purpose solvers, designed to solve a wide type or class of problems. Other solvers are designed to solve specific types or classes of problems. A non-limiting exemplary set of types or classes of problems includes: linear and non-linear equations, systems of linear equations, non-linear systems, systems of polynomial equations, linear and non-linear optimization problems, systems of ordinary differential equations, satisfiability problems, logic problems, constraint satisfaction problems, shortest path or traveling salesperson problems, minimum spanning tree problems, and search problems.

There are numerous solvers available, most of which are designed to execute on classical computing hardware, that is computing hardware that employs digital processors and/or processor-readable nontransitory storage media (e.g., volatile memory, non-volatile memory, disk based media). More recently, solvers designed to execute on non-classical computing hardware are becoming available, for example solvers designed to execute on analog computers, for instance an analog computer including a quantum processor.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f \quad (0a)$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can transition to a higher energy state, such as the first excited state. Generally, an "adiabatic" evolution is considered to be an evolution that satisfies the adiabatic condition:

$$\dot{s}|\langle 1|dH_e/ds|0\rangle| = \delta g^2(s) \quad (0b)$$

where $\dot{s}$ is the time derivative of s, g(s) is the difference in energy between the ground state and first excited state of the system (also referred to herein as the "gap size") as a function of s, and $\delta$ is a coefficient much less than 1.

Generally the initial Hamiltonian $H_i$ and the final Hamiltonian $H_f$ do not commute. That is, $[H_i, H_f] \neq 0$.

The process of changing the Hamiltonian in adiabatic quantum computing may be referred to as evolution. The rate of change, for example, change of s, is slow enough that the system is always in the instantaneous ground state of the evolution Hamiltonian during the evolution, and transitions at anti-crossings (i.e., when the gap size is smallest) are avoided. The example of a linear evolution schedule is given above. Other evolution schedules are possible including non-linear, parametric, and the like. Further details on adiabatic quantum computing systems, apparatus, and methods are described in, for example, U.S. Pat. Nos. 7,135,701 and 7,418,283.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, to reach a global energy minimum more accurately and/or more quickly than classical annealing. In quantum annealing thermal effects and other noise may be present to aid the annealing. However, the final low-energy state may not be the global energy minimum. Adiabatic quantum computation, therefore, may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P, \quad (0c)$$

where A(t) and B(t) are time dependent envelope functions. The Hamiltonian $H_E$ may be thought of as an evolution Hamiltonian similar to $H_e$ described in the context of adiabatic quantum computation above. The delocalization may be removed by removing $H_D$ (i.e., reducing A(t)). The delocalization may be added and then removed. Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem but the system does not necessarily stay in the ground state at all times. The energy landscape of $H_P$ may be crafted so that its global minimum is the answer to the problem to be solved, and low-lying local minima are good approximations.

Persistent Current

A superconducting flux qubit (such as a radio frequency superconducting quantum interference device; "rf-SQUID") may comprise a loop of superconducting material (called a "qubit loop") that is interrupted by at least one Josephson junction. Since the qubit loop is superconducting, it effectively has no electrical resistance. Thus, electrical current traveling in the qubit loop may experience no dissipation. If an electrical current is coupled into the qubit loop by, for example, a magnetic flux signal, this current may continue to circulate around the qubit loop even when the signal source is removed. The current may persist indefinitely until it is interfered with in some way or until the qubit loop is no longer superconducting (due to, for example, heating the qubit loop above its critical temperature). For the purposes of this specification, the term "persistent current" is used to describe an electrical current circulating in the qubit loop of a superconducting qubit. The sign and magnitude of a persistent current may be influenced by a variety of factors, including but not limited to a flux signal $\phi_x$ coupled directly into the qubit loop and a flux signal $\phi_{CJJ}$ coupled into a compound Josephson junction that interrupts the qubit loop.

Quantum Processor

A quantum processor may take the form of a superconducting quantum processor. A superconducting quantum processor may include a number of qubits and associated local bias devices. A superconducting quantum processor may also employ couplers to provide tunable communicative connections between qubits. A qubit and a coupler resemble each other but differ in physical parameters. One difference is the parameter, $\beta$. Consider an rf-SQUID, superconducting loop interrupted by a Josephson junction, $\beta$ is the ratio of the inductance of the Josephson junction to the geometrical inductance of the loop. A design with lower values of $\beta$, about 1, behaves more like a simple inductive loop, a monostable device. A design with higher values is more dominated by the Josephson junctions, and is more likely to have bistable behavior. The parameter, $\beta$ is defined a $2\pi L I_C/\Phi_0$. That is, $\beta$ is proportional to the product of inductance and critical current. One can vary the inductance, for example, a qubit is normally larger than its associated coupler. The larger device has a larger inductance and thus the qubit is often a bistable device and a coupler monostable. Alternatively the critical current can be varied, or the product of the critical current and inductance can be varied. A qubit often will have more devices associated with it. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Many techniques for using quantum annealing to solve computational problems involve finding ways to directly map/embed a representation of a problem to the quantum processor. Generally, a problem is solved by first casting the problem in a contrived formulation (e.g., Ising spin glass, QUBO, etc.) because that particular formulation maps directly to the particular embodiment of the quantum processor being employed. A QUBO with N variables, or spins $s \in [-1, +1]$, may be written as a cost function of the form:

$$E(s) = \sum_i^N h_i s_i + \sum_{i<j} J_{ij} s_i s_j, \quad (1)$$

where $h_i$ and $J_{ij}$ are dimensionless quantities that specify a desired Ising spin glass instance. Solving this problem involves finding the spin configuration $s_i$ that minimizes E for the particular set of $h_i$ and $J_{ij}$ provided. In some implementations, the allowed range of $h_i \in [-2, 2]$ and $J_{ij} \in [-1, 1]$. For reasons described later, the $h_i$ and $J_{ij}$ are not perfectly represented on the hardware during optimization. These misrepresentations may be defined as control errors:

$$h_i \to h_i \pm \delta h_i \quad (2a)$$

$$J_{ij} \to J_{ij} \pm \delta J_{ij} \quad (2b)$$

Control errors $\delta h$ and $\delta J$ arise from multiple sources. Some sources of error are time dependent and others are static, but depend on a particular suite of h and J values.

Intrinsic/Control Error (ICE)

A quantum processor may implement a time-dependent Hamiltonian of the following form:

$$\frac{H(t)}{J_{AFM}(t)} = -\sum_i h_i \sigma_z^{(i)} + \sum_{i,j>i} J_{ij} \sigma_z^{(i)} \sigma_z^{(j)} - \sum_i \Gamma_i(t) \sigma_x^{(i)} \quad (3a)$$

where $\Gamma_i(t)$ is a dimensionless quantity describing the amplitude of the single spin quantum tunneling, and $J_{AFM}(t)$ is an overall energy scale. Equation 3a is the desired or target Hamiltonian. Quantum annealing is realized by guiding the system through a quantum phase transition from a delocalized ground state at t=0, subject to $\Gamma_i$ (t=0)»$h_i$, $J_{ij}$, to a localized spin state at t=$t_f$, subject to $\Gamma_i$ ($t_f$)«$h_i$, $J_{ij}$. Further details concerning this evolution can be found in Harris et al., Experimental investigation of an eight-qubit unit cell in a superconducting optimization processor, Phys. Rev. B, Vol. 82, Issue 2, 024511, 2010 ("Harris 2010b"). The Hamiltonian given by equation 3a may be implemented on quantum annealing processors using networks of inductively coupled superconducting flux qubits and couplers as described in, for example Harris et al., Compound Josephson-junction coupler for flux qubits with minimal crosstalk, Phys. Rev. B, Vol. 80, Issue 5, 052506, 2009 ("Harris 2009") and Harris et al., Experimental demonstration of a robust and scalable flux qubit, Phys. Rev. B, Vol. 81, Issue 13, 134510 ("Harris 2010a"). As described in Harris 2010b, the dimensionless parameters $h_i$, $J_{ij}$, and $\Gamma_i$ (t) map onto physical device parameters in the following manner:

$$h_i = \frac{|I_i^P(t)|(\Phi_i^x(t) - \Phi_i^0)}{J_{AFM}(t)} \quad (3b)$$

$$J_i = \frac{M_{ij}|I_i^P(t)||I_j^P(t)|}{J_{AFM}(t)} \quad (3c)$$

$$\Gamma_i(t) = \frac{\Delta_i(t)}{2J_{AFM}(t)} \quad (3d)$$

where $\Phi_i^x(t)$ is a time-dependent flux bias applied to a qubit i, $\Phi_i^0$ is the nominally time-independent degeneracy point of qubit i, and $M_{ij}$ is the effective mutual inductance provided by the tunable interqubit coupler between qubits i and j. The time-dependent quantities $|I_i^P(t)|$ and $\Delta_i(t)$ correspond to the magnitude of the qubit persistent current and tunneling energy, respectively, of qubit i. Averages of these quantities across a processor are indicated by $|I_i^p(t)|$ and $\Delta_i(t)$. The global energy scale $J_{AFM}(t) \equiv M_{AFM}|I_i^p(t)|$ given by the Hamiltonian in equation 3a has been defined in terms of the average qubit persistent current $|I_i^p(t)|$ and the maximum antiferromagnetic (AFM) mutual inductance $M_{AFM}$ that can be achieved by all couplers across a processor.

Quantum annealing implemented on a quantum processor aims to realize time-independent $h_i$ and $J_{ij}$. The reason for doing so is to ensure that the processor realizes the target Ising spin glass instance independent of during the course of quantum annealing the state of the system localizes via a quantum phase transition. Equation 3c naturally yields a time-independent quantity upon substituting the definition of $J_{AFM}(t)$ and assuming that:

$$|I_i^p(t)| = |I_j^p(t)| = |I_q^p(t)|.$$

In order to expunge the time-dependence from $h_i$ in Equation 3b, subject to the assumption that:

$$|I_i^p(t)| = |I_q^p(t)|,$$

time-dependent flux bias applied to the i-th qubit $\Phi_i^x(t)$ of the form:

$$\Phi_i^x(t) = M_i \alpha |I_q^p(t)| + \Phi_i^o \quad (3e)$$

should be applied where $\alpha|I_q^p(t)|$ represents an externally supplied bias current that emulates the evolution of the qubit persistent current $|I_q^p(t)|$ multiplied by a dimensionless factor $\alpha \gg 1$ and $M_i \equiv h_i M_{AFM}/\alpha$ is the effective mutual inductance between the aforementioned external current bias and the body of qubit i. The logic leading to equation 3e and its implementation in hardware is discussed in detail in Harris 2010b.

Equations 3a-3e link the dimensionless user-specified quantities $h_i$ and $J_{ij}$ that define an Ising spin glass instance to the physical properties of qubits and couplers. These hardware elements are subject to practical constraints, both in design and fabrication that ultimately limit the amount of control that the user can exert on the Ising spin glass parameters $h_i$ and $J_{ij}$. The term Intrinsic/Control Error (ICE) defines the resolution to which one $h_i$ and $J_{ij}$ can be realized on a quantum processor (i.e., chip). Sources of error can be classified based on whether they are due to some intrinsic non-ideality of a particular device on a chip or whether they are due to the finite resolution of some control structure. Arguably, the resolution to which $\Gamma_i$ can be controlled could have significant bearing on the efficacy of quantum annealing. For the purpose of the present systems and methods, it is assumed that all $\Gamma_i(t)$ are identical.

The impact of ICE can be characterized by modifying the definitions of $h_i$ and $J_{ij}$ given above to include physical sources of error:

$$h_i \to \frac{(|I_q^p(t)| + \delta|I_i^p(t)|)(\Phi_i^x(t) - \Phi_i^o - \delta\Phi_i^o)}{J_{AFM}(t)} \quad (4a)$$

$$J_{ij} \to \frac{(M_{ij} + \delta M_{ij})(|I_q^p(t)| + \delta|I_i^p(t)|)(|I_q^p(t)| + \delta|I_j^p(t)|)}{J_{AFM}(t)} \quad (4b)$$

$$\Phi_i^x(t) \to (M_i + \delta M_i)\alpha|I_q^p(t)| + \Phi_i^o \quad (4c)$$

where the assumption is that the global variables $M_{AFM}$, $|I_q^p(t)|$, and $\alpha$ have been calibrated to high precision. A sparse network of analog control lines that allow for high precision one- and two-qubit operations can be used in order to calibrate these quantities. Thus, $\delta|I_i^p(t)|$, $\delta|I_j^p(t)|$, $\delta\Phi_i^o$, $\delta M_i$, and $\delta M_{ij}$ represent the perturbations that give rise to errors in $h_i$ and $J_{ij}$. Generally, these perturbations are small and so therefore it may be neglected in the present systems and methods so that only the errors in $h_i$ and $J_{ij}$ that are first order are taken into consideration.

If the deviations in the qubit persistent current $\delta|I_i^p(t)| \neq 0$ and $\delta|I_j^p(t)| \neq 0$ and if all other deviations are set to zero, recalling that in the ideal case $M_i \equiv h_i M_{AFM}/\alpha$ and $M_{ij} \equiv J_{ij} M_{AFM}$, substituting equation 4c into equation 4a and 4b then yields errors in the instance parameters of the following form:

$$\delta h_i = h_i \frac{\delta|I_i^p(t)|}{|I_q^p(t)|} \quad (5a)$$

$$\delta J_{ij} = J_{ij} \sqrt{\left[\frac{\delta|I_i^p(t)|}{|I_q^p(t)|}\right]^2 + \left[\frac{\delta|I_j^p(t)|}{|I_q^p(t)|}\right]^2} \to J_{ij} 2 \frac{\delta|I_i^p(t)|}{|I_q^p(t)|} \quad (5b)$$

where the assumption in the formula for $\delta J_{ij}$ is the absolute worst-case scenario in which the deviations of the two persistent currents are correlated and equal in magnitude.

Deviations in the mutual inductance $\delta M_i \neq 0$, with all others set to zero, only affect $h_i$. Substituting equation 4c into equation 4a yields:

$$\delta h_i = \frac{\delta M_i}{M_{AFM}/\alpha} \quad (5c)$$

Likewise, deviations of the qubit degeneracy point $\delta\Phi_i^o$, with all others set to zero, also only affect $h_i$. Substituting equation 4c into equation 4a yields a time dependent error:

$$\delta h_i = \frac{\delta\Phi_i^o}{M_{AFM}|I_i^p(t)|}. \quad (5d)$$

Finally, deviations in interqubit coupling mutual inductance $\delta M_{ij}$, with all others set to zero, only affect $J_{ij}$ as shown below:

$$\delta J_{ij} = \frac{\delta M_{ij}}{M_{AFM}}. \quad (5e)$$

It is worth noting that deviations in the qubit persistent current $\delta|I_i^p(t)| \neq 0$ and $\delta|I_j^p(t)| \neq 0$ lead to relative errors in the problem instance settings, as given by equations 5a and 5b. In contrast, deviations in mutual inductances and flux offsets lead to absolute errors. One convention defines the allowed range of problem instance specifications to be $-1 \leq h_i$, $J_{ij} \leq 1$. For relative errors, an upper bound on an absolute error is realized if $|h_i| = |J_{ij}| = 1$.

Equations 5a to 5e produce absolute errors (or upper bounds on absolute errors) as a function of perturbations in qubit persistent current $\delta|I_i^p(t)|$, qubit degeneracy point $\delta\Phi_i^o$, mutual inductance $\delta M_i$, and interqubit coupling $\delta M_{ij}$. Identifying the physical mechanisms that give rise to these four quantities and studying worst-case scenarios under which those mechanisms give rise to ICE may help reduce such errors.

BRIEF SUMMARY

A computational system may be summarized as including: at least one quantum processor comprising: a plurality of qubits including a first set of qubits and a second set of qubits; a plurality of coupling devices, wherein each coupling device provides controllable communicative coupling between two of the plurality of qubits; a first readout subsystem responsive to a state of each of the qubits in the first set of qubits to generate a first set of detected samples, each detected sample in the first set of detected samples represents a respective one of the qubits in the first set of qubits; at least one post-processing processor-based device communicatively coupled to the at least one quantum processor; and at least one non-transitory computer-readable storage medium communicatively coupled to the at least one post-processing processor-based device and that stores at least one of processor-executable instructions or data, where in use the at least one post-processing processor-based device: receives the first set of detected samples that represents the qubits in the first set of qubits; and post-processes the first set of detected samples to generate a first set of derived samples, each sample in the first set of derived samples represents a respective one of the qubits in the second set of qubits.

Each coupling device may be positioned proximate a respective point where a respective one of the qubits in the first set of qubits is proximate one of the qubits in the second set of qubits and provides controllable communicative coupling between the qubit in the first set of qubits and the respective qubit in the second set of qubits. In some embodiments, at least one qubit in the second set of qubits can be configured such that it is not communicatively coupled to any qubit in the first set of qubits.

The at least one post-processing processor-based device may include at least one of a microprocessor, a digital signal processor (DSP), a graphical processing unit (GPU), or a field programmable gate array (FPGA). The at least one post-processing processor-based device may generate the derived samples that represent the second set of qubits by execution of an exact sampling procedure, and may continue execution of the exact sampling procedure until one or more termination criteria occur.

The at least one post-processing processor-based device: may generate the derived samples that represent the second set of qubits by execution of a local gradient descent procedure on the detected samples, or by execution of a Gibbs sampling procedure. The at least one post-processing processor-based device may generate at least two of the derived samples that represent the second set of qubits concurrently.

In use, the at least one post-processing processor-based device may further: return the first set of detected samples and the first set of derived samples. In use, the at least one quantum processor may perform quantum annealing or adiabatic quantum computing.

The qubits in the first set of qubits and the qubits in the second set of qubits may be fixed. The qubits in the first set of qubits and the qubits in the second set of qubits may be variable. The qubits in the first set of qubits and the qubits in the second set of qubits may be randomly selected.

Each of the qubits in the first and the second sets of qubits may have a respective major axis, the major axes of the qubits of the first set parallel with one another along at least a majority of a length thereof, and the major axes of the qubits of the second set parallel with one another along at least a majority of a length thereof, the major axes of the qubits of the second set of qubits nonparallel with the major axes of the qubits of the first set of qubits, and each qubit in the first set of qubits crosses at least one qubit in the second set of qubits, and wherein each coupling device is positioned proximate a respective point where a respective one of qubits in the first set of qubits crosses one of the qubits in the second set of qubits and provides controllable communicative coupling between the qubit in the first set of qubits and the respective qubit in the second set of qubits. The respective major axis of each qubit in the first set of qubits may be perpendicular to the respective major axis of each qubit in the second set of qubits such that each qubit in the first set of qubits perpendicularly crosses at least one qubit in the second set of qubits. At least a portion of each qubit in the first set of qubits may be carried in a first layer and at least a portion of each qubit in the second set of qubits may be carried in a second layer, such that at each respective point where one of the qubits in the first set of qubits crosses one of the qubits in the second set of qubits, the respective qubit in the first set of qubits is in the first layer and the qubit in the second set of qubits is in the second layer, the second layer different than the first layer. The first set of qubits may include at least four qubits and the second set of qubits may include at least four qubits.

The quantum processor may include a multi-layered integrated circuit. The quantum processor may include a superconducting quantum processor and the multi-layered integrated circuit may include a multi-layered superconducting integrated circuit.

The computational system may further include: a second readout subsystem responsive to a state of each of the qubits in the second set of qubits to generate a second set of detected samples, each detected sample in the second set of detected samples represents a respective one of the qubits in the second set of qubits; where in use the at least one post-processing processor-based device: receives the second set of detected samples that represents the qubits in the second set of qubits; and processes the second set of detected samples to generate a second set of derived samples, each derived sample in the second set of derived samples represents a respective one of the qubits in the first set of qubits. The at least one post-processing processor-based device: may generate the derived samples that represent the second set of qubits by sampling the derived samples that represent the second set of qubits conditioned on the first set of detected samples that represents the qubits in the first set of qubits.

A method of operation in a problem solving system may be summarized as including both a quantum processor and at least one processor-based device communicatively coupled to one another to at least approximately minimize an objective function, the quantum processor comprising a plurality of qubits including a first set of qubits and a second set of qubits, and a plurality of coupling devices, wherein each coupling device provides controllable communicative coupling between two of the plurality of qubits, the method comprising: operating the quantum processor as a sample generator to provide samples from a probability distribution, wherein a shape of the probability distribution depends on a configuration of a number of programmable parameters for the quantum processor and a number of low-energy states of the quantum processor respectively correspond to a number of high probability samples of the probability distribution, and wherein operating the quantum processor as a sample generator comprises: defining a configuration of the number of programmable parameters for the quantum processor via the at least one processor-based device, wherein the configuration of the number of programmable parameters corresponds to a probability distribution over the plurality of qubits of the quantum processor; programming the quantum processor with the configuration of the number of programmable parameters via a programming subsystem; evolving the quantum processor via an evolution subsystem; and reading out states for the qubits in the first set of qubits of the quantum processor via a readout subsystem, wherein the states for the qubits in the first set of qubits of the quantum processor correspond to samples from the probability distribution; processing the samples read via the readout system via the at least one processor-based device, wherein processing the samples read via the readout system via the at least one processor-based device comprises: determining respective states for the qubits in the second set of qubits based on samples read via the readout system via the at least one processor-based device.

The method of operation can further include, where the plurality of qubits includes a third set of qubits and a fourth set of qubits: operating the quantum processor as a sample generator to provide samples from a probability distribution, wherein a shape of the probability distribution depends on a configuration of a number of programmable parameters for the quantum processor and a number of low-energy states of the quantum processor respectively correspond to a number of high probability samples of the probability distribution, and wherein operating the quantum processor as a sample generator comprises: defining a configuration of the number of programmable parameters for the quantum processor via the at least one processor-based device, wherein the configuration of the number of programmable parameters corresponds to a probability distribution over the plurality of qubits of the quantum processor; programming the quantum processor with the configuration of the number of programmable parameters via a programming subsystem; evolving the quantum processor via an evolution subsystem; and reading out states for the qubits in the third set of qubits of the quantum processor via a readout subsystem, wherein the states for the qubits in the third set of qubits of the quantum processor correspond to samples from the probability distribution; processing the samples read via the readout system via the at least one processor-based device, wherein processing the samples read via the readout system via the at least one processor-based device comprises: determining respective states for the qubits in the fourth set of qubits based on samples read via the readout system via the at least one processor-based device.

Processing the samples read via the readout system via the at least one processor-based device may include processing the samples read via the readout system via at least one of a microprocessor, a digital signal processor (DSP), a graphical processing unit (GPU), or a field programmable gate array (FPGA).

Determining respective states for the qubits in the second set of qubits based on samples read via the readout system via the at least one processor-based device can comprise executing at least one of: an optimization operation, an enumeration, a sampling operation or evaluation of estimators.

Determining respective states for the qubits in the second set of qubits based on samples read via the readout system via the at least one processor-based device may include executing at least one of: a local gradient descent procedure or a Gibbs sampling procedure. The method may further include: selecting which ones of the qubits of the quantum processor are in the first set of qubits and which ones of the qubits of the quantum processor are in the second set of qubits. The method may further include: selectively modifying which ones of the qubits of the quantum processor are in the first set of qubits and which ones of the qubits of the quantum processor are in the second set of qubits. Determining respective states for the qubits in the second set of qubits based on samples read via the readout system via the at least one processor-based device may include performing a classical heuristic optimization algorithm to determine states for the qubits in the second set of qubits based on samples read via the readout system via the at least one processor-based device. Performing a classical heuristic optimization algorithm to determine states for the qubits in the second set of qubits based on samples read via the readout system via the at least one processor-based device may include performing at least one of: a majority voting on chains of qubits post-processing operation, a local search to find a local minima post-processing operation, or a Markov Chain Monte Carlo simulation at a fixed temperature post-processing operation. Evolving the quantum processor via an evolution subsystem may include performing at least one of adiabatic quantum computation or quantum annealing. Operating the quantum processor as a sample generator may include: reading out states for the qubits in the second set of qubits of the quantum processor via the readout subsystem, wherein the states for the qubits in the first set of qubits of the quantum processor correspond to samples from the probability distribution; wherein processing the samples read via the readout system via the at least one processor-based device comprises: determining respective states for the qubits in the first set of qubits based on the samples read via the readout system via the at least one processor-based device. Determining respective states for the qubits in the second set of qubits based on samples read via the readout system via the at least one processor-based device may include: sampling the states for the qubits in the second set of qubits conditioned on the states for the qubits that represent the first set of qubits read via the readout system.

A quantum processor may be summarized as including: a plurality of qubits including a first set of qubits and a second set of qubits, wherein each of the qubits in the first and the second sets of qubits have a respective major axis, the major axes of the qubits of the first set parallel with one another along at least a majority of a length thereof, and the major axes of the qubits of the second set parallel with one another along at least a majority of a length thereof, the major axes of the qubits of the second set of qubits nonparallel with the major axes of the qubits of the first set of qubits, and each qubit in the first set of qubits crosses at least one qubit in the second set of qubits; a plurality of coupling devices, wherein each coupling device is positioned proximate a respective point where a respective one of qubits in the first set of qubits crosses one of the qubits in the second set of qubits and provides controllable communicative coupling between the qubit in the first set of qubits and the respective qubit in the second set of qubits; and a readout subsystem responsive to a state of each of the qubits in the first set of qubits to generate a set of detected samples, each detected sample in the first set of detected samples represents a respective one of the qubits in the first set of qubits, the readout subsystem nonresponsive to a state of each of the qubits in the second set of qubits.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 6B is a diagram of a graphical representation of an example set of connections between qubits, in accordance with the presently described system, devices, articles and methods.

FIG. 6C illustrates an arrangement of inter-cell connections between qubits.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with digital processors, such as digital microprocessors, digital signal processors (DSPs), digital graphical processing units (GPUs), field programmable gate arrays (FPGAs); analog or quantum processors, such as quantum devices, coupling devices, and associated control systems including microprocessors, processor-readable nontransitory storage media, and drive circuitry have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Figure 1A:
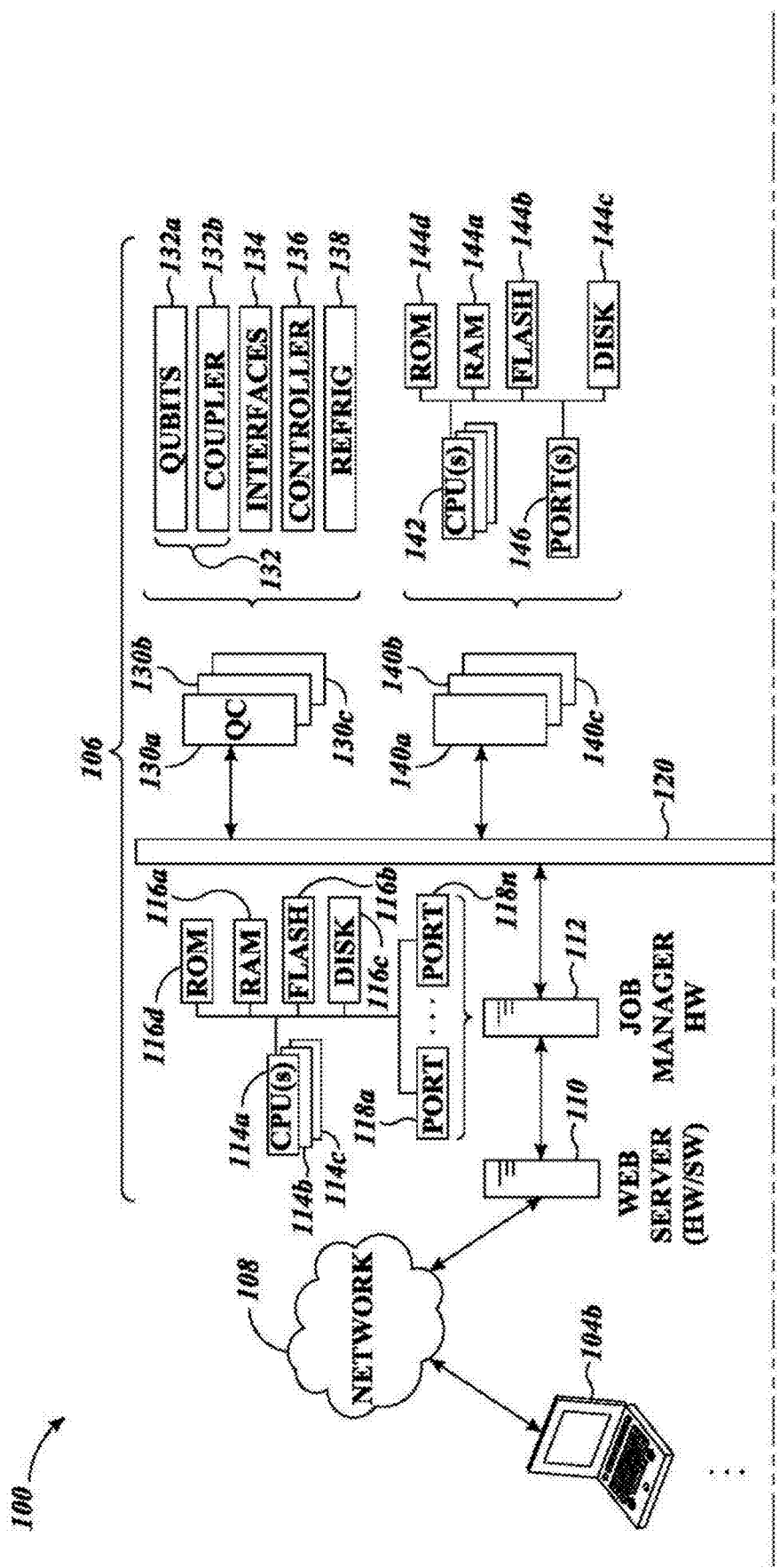
FIGS. 1A and 1B are schematic diagrams of an environment in which users may access a system via one or more networks, in accordance with the presently described systems, devices, articles and methods, illustrating various hardware structures and interconnections therebetween.
Figure 1B:
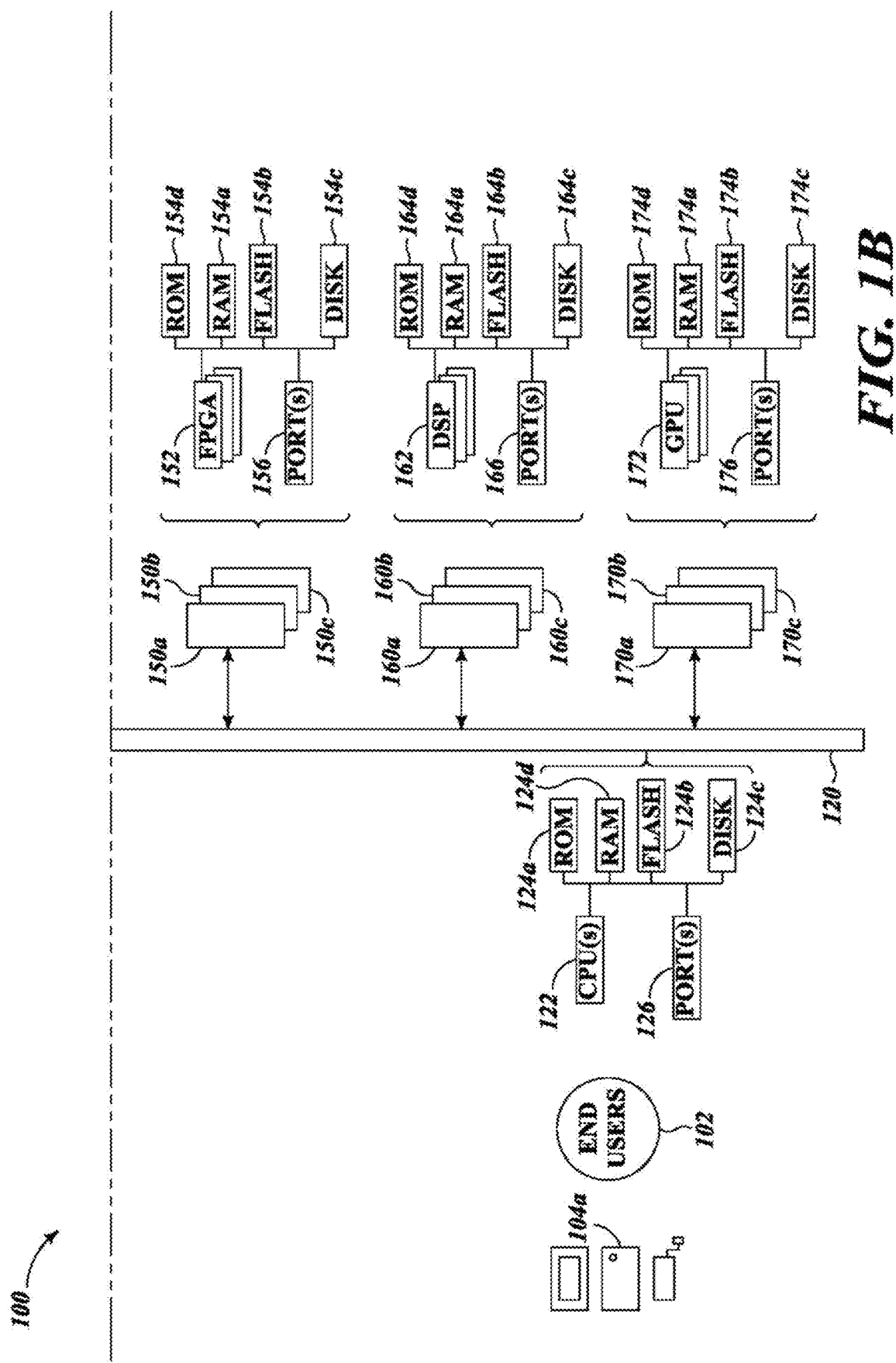

FIGS. 1A and 1B show an exemplary networked environment 100 in which a plurality of end users 102 (only one shown) operate end user processor-based devices 104a-104n (collectively 104) to access a computational system 106 via one or more communications channels such as networks 108, according to the presently described systems, devices, articles and methods.

The end user processor-based devices 104 may take any of a variety of forms, for example including desktop computers or workstations 104a, laptop computers 104b, tablet computers (not shown), netbook computers (not shown), and/or smartphones (not shown).

The computational system 106 may include a front-end processor-based device, for example a server computer system such as a Web server computer system 110 which includes one or more processors (not shown), nontransitory processor-readable media (not shown) and which executes processor-executable server instructions or software. The front-end server or Web server computer system 110 handles communication with the outside world. For example, the Web server computer system 110 provides an interface (server application programming interface or SAPI) for the submission by the end user processor-based devices 104 of problems to be solved. Also for example, the Web server computer system 110 provides results of problem solving to the end user processor-based devices 104. The Web server computer system 110 may provide a user friendly user interface, for example a Web-based user interface. The Web server computer system 110 may, for example, handle users' accounts, including authentication and/or authorization to access various resources. The Web server computer system 110 may also implement a firewall between the remainder of the computational system 106 and the outside world (e.g., end user processor-based devices 104).

The SAPI accepts a broader range of pseudo-Boolean optimization problems, including constrained problems. End users may, for example, indicate whether the solving should identify minima or should sample with Boltzmann probability. The SAPI also supports unconstrained QUBOs of arbitrary connectivity. The SAPI also accepts graphical models, for instance factor-graph description of undirected graphical models defined over binary-valued variables. The SAPI may allow for a description of factors specified with the scope of the factor and an extensional list of factor values. Support is preferably provided for factors mapping inputs to floating point values and to Boolean values for constraint satisfaction problems (CSP). The SAPI also accepts quadratic assignment problems (QAPs) since many practical problems involve assignment constraints. The SAPI may accept satisfiability problems (SAT), for instance: k-SAT, a CSP version; or max (weighted) SAT, the optimization version. Standard DIMACS formats exist for both types of problems.

Figure 3A:
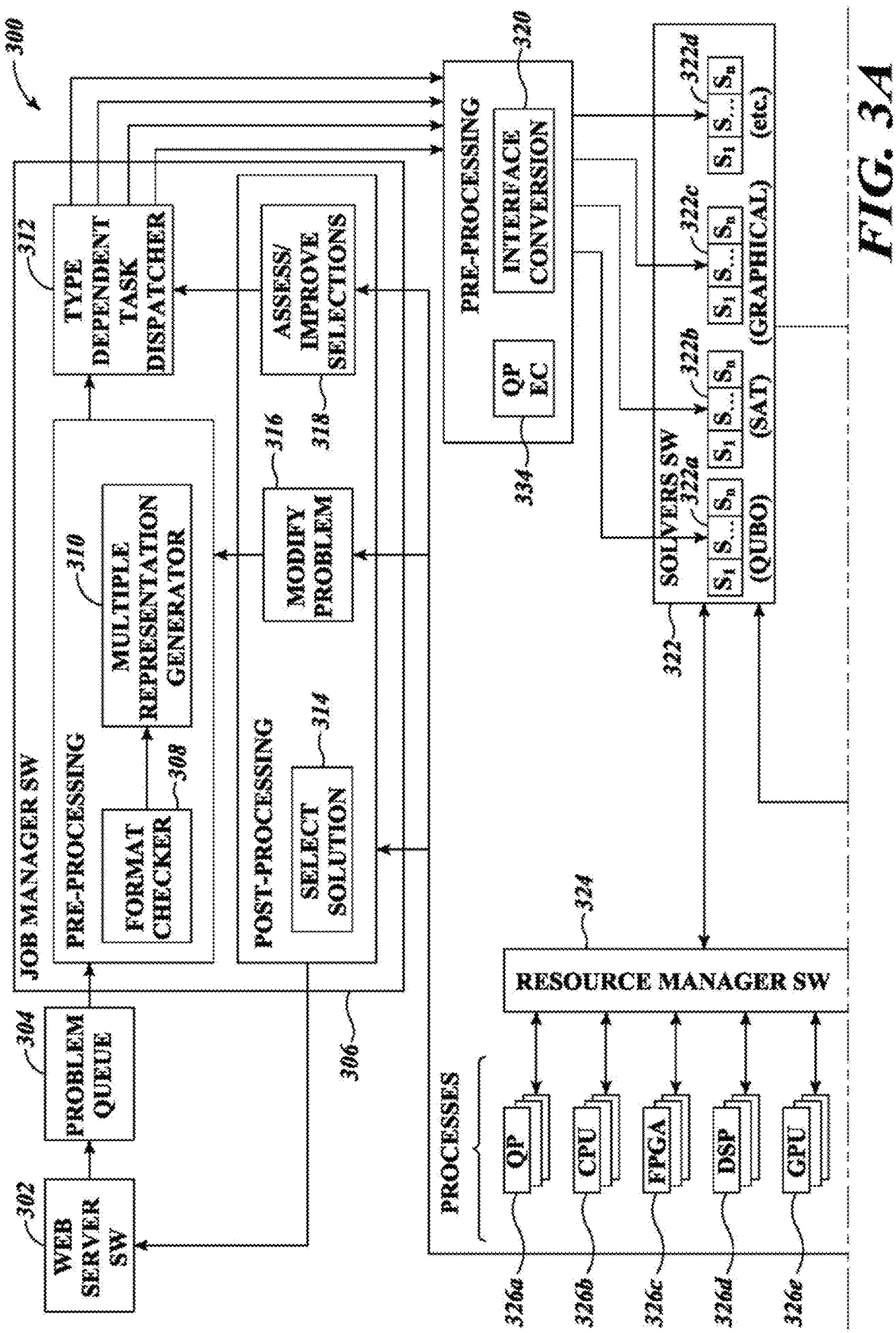
FIGS. 3A and 3B are schematic diagrams showing various software modules, processes and abstraction layers implemented by the system of FIGS. 1A and 1B, such as a job manager or instructions module, resource manager module, solver modules, pre-processing and post-processing modules, in accordance with the presently described systems, devices, articles and methods.
Figure 3B:
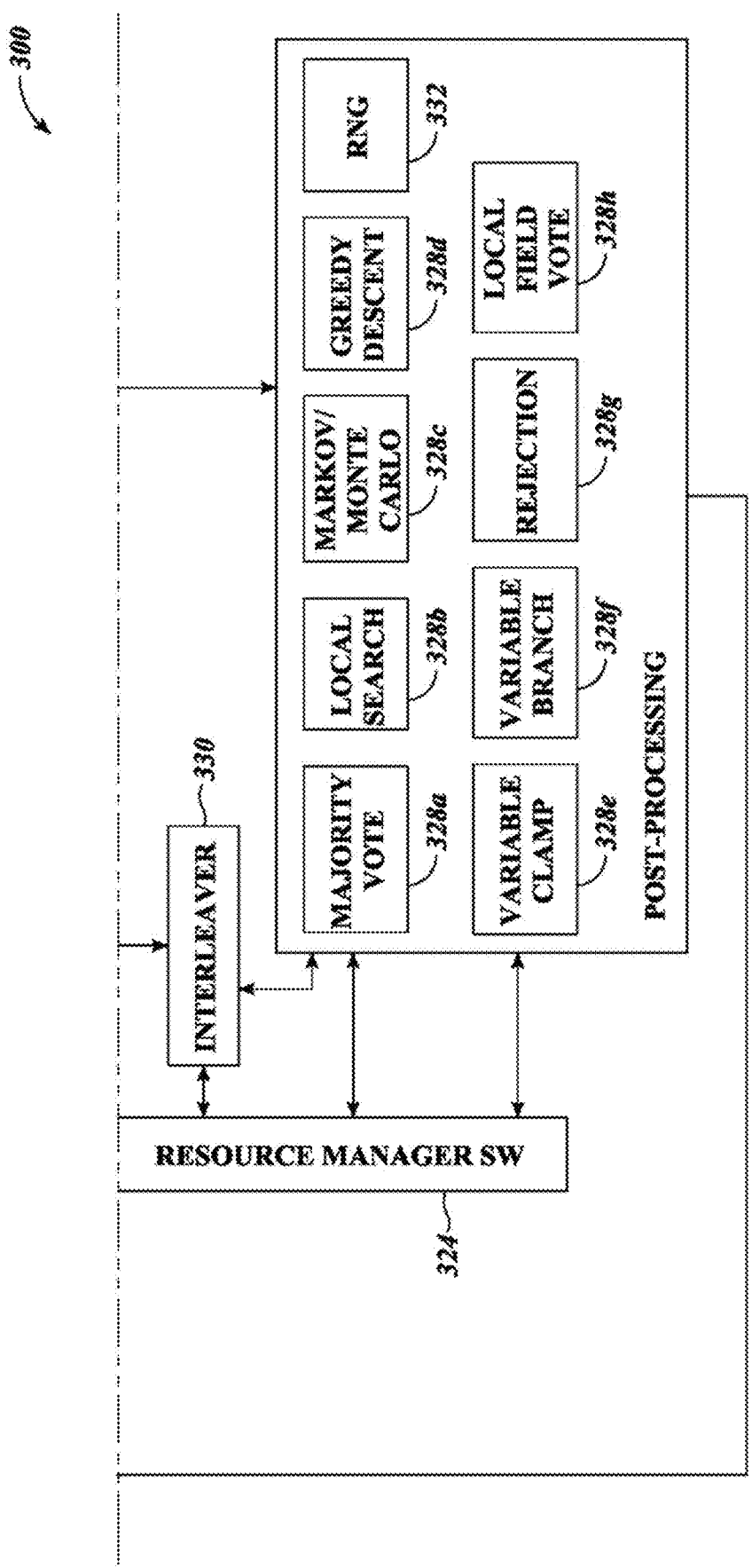

The computational system 106 may include job manager hardware 112 which manages jobs (i.e., submitted problems and results of problem solving). The job manager hardware 112 may be implemented as a standalone computing system, which may include one or more processors 114, processor-readable nontransitory storage media 116a-116d (four shown, collectively 116) and communications ports 118a, 118n (two shown, collectively 118). The processor(s) 114 may take a variety of forms, for example one or more microprocessors, each having one or more cores or CPUs, registers, etc. The job manager hardware 112 may include volatile media or memory, for example static random access memory (SRAM) or dynamic random access memory (DRAM) 116a. The job manager hardware 112 may include non-volatile media or memory, for example read only memory (ROM) 116d, flash memory 116b, or disk based memory such as magnetic hard disks, optical disks 116c, magnetic cassettes, etc. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In-line Memory Modules. The processor-readable nontransitory storage media 116 store(s) at least one set of processor-executable instructions and/or data (e.g., job manager instructions or software module 306, FIGS. 3A and 3B) to manage problem solving jobs, which when executed by the job manager hardware 112 implements a job manager (FIGS. 3A and 3B).

The computational system 106 may include resource manager hardware 120 which manages hardware resources (e.g., processors) for use in solving problems via a plurality of solvers. The resource manager hardware 120 may be implemented as a standalone computing system, which may include one or more processors 122, each having one or more cores, processor-readable nontransitory storage media 124a-124d (four shown, collectively 124) and one or more communications ports 126. The processor(s) 122 may take a variety of forms, for example one or more microprocessors, each having one or more cores or CPUs, registers, etc. The resource manager hardware 120 may include non-volatile media or memory, for example read only memory (ROM) 124a, flash memory 124b, or disk based memory such as magnetic hard disks 124c, optical disks, etc. The resource manager hardware 120 may include volatile media or memory, for example static random access memory (SRAM) or dynamic random access memory (DRAM) 124d. The processor-readable nontransitory storage media 124 store(s) at least one of set pf processor-executable instructions and/or data (e.g., resource manager instructions or software module 324, FIGS. 3A and 3B) which when executed by the resource manager hardware 120 implements a resource manager to manage hardware resources, for example the various non-quantum processor systems and/or quantum processor systems set out immediately below. The resource manager may, for instance, manage an allocation of processor resources (e.g., quantum processor(s)) to solve a submitted problem via one or more solvers.

As noted above, the computational system 106 may further include a plurality of solver processor systems which execute solver instructions or software to implement a plurality of solvers to solve appropriate types of problems (e.g., QUBO matrix, satisfiability (SAT) problem, a graphical model (GM) or a quantum assignment problem (QAP)).

The solver processor systems may, for example, include one or more quantum processor systems 130a-130c (three illustrated, collectively 130, only one shown in detail). Quantum processor systems 130 may take a variety of forms. Typically, quantum processors systems 130 will include one or more quantum processors 132 comprised of a plurality of qubits 132a and couplers 132b (e.g., tunable ZZ-couplers) which are controllable to set a coupling strength between respective pairs of qubits 132a to provide pair-wise coupling between qubits. The quantum processor systems 130 may be implemented to physically realize adiabatic quantum computing (AQC) and/or quantum annealing (QA) by initializing the system with the Hamiltonian and evolving the system to the Hamiltonian described in accordance with the evolution.

The quantum processors systems 130 typically include a plurality of interfaces 134 operable to set or establish conditions or parameters of the qubits 132a and couplers 132b, and to read out the states of the qubits 132a, from time-to-time. The interfaces 134 may each be realized by a respective inductive coupling structure, as part of a programming subsystem and/or an evolution subsystem. Interfaces for reading out states may, for instance take the form of DC-SQUID magnetometers. Such a programming subsystem and/or evolution subsystem may be separate from quantum processor 130, or it may be included locally (i.e., on-chip with quantum processor 130) as described in, for example, U.S. Pat. Nos. 7,876,248 and 8,035,540.

The quantum processors systems 130 typically each include a controller 136, for instance a digital computer system, which is operated to configure the quantum processor 132. The quantum processors systems 130 typically each include a refrigeration system 138, operable to reduce a temperature of the quantum processor 132 to a point at or below which various elements of the quantum processor 132 (e.g., qubits 132a, couplers 132b) superconduct. Superconducting quantum computers normally are operated at milliKelvin temperatures and often are operated in a dilution refrigerator. Examples of dilution refrigerators include the Oxford Instruments Triton 400 (Oxford Instruments plc, Tubney Woods, Abingdon, Oxfordshire, UK) and BlueFors LD 400 (BlueFors Cryogenics Oy Ltd, Arinatie 10, Helsinki, Finland). All or part of the components of quantum processor may be housed in a dilution refrigerator.

In the operation of a quantum processor system 130, interfaces 134 may each be used to couple a flux signal into a respective compound Josephson junction of qubits 132a, thereby realizing the $\Delta_i$ terms in the system Hamiltonian. This coupling provides the off-diagonal $\sigma^x$ terms of the Hamiltonian and these flux signals are examples of "disordering signals." Other ones of the interfaces 134 may each be used to couple a flux signal into a respective qubit loop of qubits 132a, thereby realizing the $h_i$ terms in the system Hamiltonian. This coupling provides the diagonal $\sigma^z$ terms. Furthermore, one or more interfaces 134 may be used to couple a flux signal into couplers 132b, thereby realizing the $J_{ij}$ term(s) in the system Hamiltonian. This coupling provides the diagonal $\sigma_i^z, \sigma_j^z$ terms. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 134.

The solver processor systems may, for example, include one or more non-quantum processor systems. Non-quantum processor systems may take a variety of forms, at least some of which are discussed immediately below.

For example, the non-quantum processor systems may include one or more microprocessor based systems 140a-140c (three illustrated, collectively 140, only one shown in detail). Typically, microprocessor based systems 140 will each include one or more microprocessors 142 (three shown, only one called out in FIGS. 3A and 3B), processor-readable nontransitory storage media 144a-144d (four shown, collectively 144) and one or more communications ports 146. The processor(s) 142 may take a variety of forms, for example one or more microprocessors, each having one or more cores or CPUs with associated registers, arithmetic logic units, etc. The microprocessor based systems 140 may include non-volatile media or memory, for example read only memory (ROM) 144d, flash memory 144b, or disk based memory such as magnetic hard disks 144c, optical disks, etc. The microprocessor based systems 140 may include volatile media or memory, for example static random access memory (SRAM) or dynamic random access memory (DRAM) 144a. The processor-readable nontransitory storage media 144 store(s) at least one of a set of processor-executable instructions and/or data which when executed by the microprocessor based systems 142 implements a microprocessor based solver to solve a submitted problem.

Also for example, the non-quantum processor systems may include one or more field programmable arrays (FPGA) based systems 150a-150c (three illustrated, collectively 150, only one shown in detail). Typically, FPGA based systems 150 will each include one or more FPGAs 152, processor-readable nontransitory storage media 154a-154d (four shown, collectively 154) and one or more communications ports 156. The FPGAs 152 may take a variety of forms, for example one or more FPGAs 152. The FPGA based systems 150 may include non-volatile media or memory, for example, read only memory (ROM) 154d, flash memory 154b, or disk based memory such as magnetic hard disks 154c, optical disks, etc. The FPGA based systems 150 may include volatile media or memory, for example static random access memory (SRAM) or dynamic random access memory (DRAM) 154d. The processor-readable nontransitory storage media 154 store(s) at least one of a set of processor-executable instructions and/or data which when executed by the FPGA based systems 150 implements a FPGA based solver to solve a submitted problem.

Also for example, the non-quantum processor systems may include one or more digital signal processor based systems 160a-160c (three illustrated, collectively 160, only one shown in detail). Typically, DSP based systems 160 will include one or more DSPs 162, processor-readable nontransitory storage media 164a-164d (four shown, collectively 160) and one or more communications ports 166. The DSPs 162 may take a variety of forms, for example one or more DSPs, each having one or more cores or CPUs, registers, etc. The DSP based systems 160 may include non-volatile media or memory, for example read only memory (ROM) 164d, flash memory 164b, or disk based memory such as magnetic hard disks 164c, optical disks, etc. The DSP based systems 160 may include volatile media or memory, for example static random access memory (SRAM) or dynamic random access memory (DRAM) 164a. The processor-readable nontransitory storage media 164 store(s) at least one of a set of processor-executable instructions and/or data which when executed by the DSP based systems 160 implements a DSP based solver to solve a submitted problem.

For example, the non-quantum processor systems may include one or more graphical processing unit (GPU) based systems 170a-170c (three illustrated, collectively 170, only one shown in detail). Typically, GPU based systems 170 will include one or more GPUs 172, processor-readable nontransitory storage media 174a-174d (four shown, collectively 174) and communications ports 176. The GPUs 172 may take a variety of forms, for example one or more GPUs, each having one or more cores or CPUs, registers, etc. The GPU based systems 170 may include non-volatile media or memory, for example, read only memory (ROM) 174d, flash memory 174b, or disk based memory such as magnetic hard disks 174c, optical disks, etc. The GPU based systems 170 may include volatile media or memory, for example static random access memory (SRAM) or dynamic random access memory (DRAM) 174a. The processor-readable nontransitory storage media 174 store(s) at least one of a set of processor-executable instructions and/or data which when executed by the GPU based systems 170 implements a GPU based solver to solve a submitted problem.

Microprocessors offer relatively few cores with large amount of fast memory per core. Microprocessors are the most flexible platform in terms of development among the four non-quantum technologies discussed herein. Microprocessors also have the fastest clock speed and the most extensive instruction sets of the four non-quantum technologies discussed herein, which includes vector operations. An example of a currently available high performance microprocessor running 8 cores with a clock speed of 3.1 GHz is the Xeon Processor E5-2687 W offered by Intel Corporation.

DSPs are the closest to microprocessors in characteristics and abilities of the four non-quantum technologies discussed herein. The main advantage of DSPs are their advanced ALU units optimized for special numerical operations like Multiply-Accumulate (MAC) as compared to microprocessors. An example of a high performance DSP running 8 cores with a clock speed of 1.4 GHz is the TMS320C6678 Multicore Fixed and Floating Point DSP Processor offered by Texas Instruments. Creating a custom board with a plurality of DSPs is typically simpler than creating a customer board using microprocessors. Most advanced DSPs offer built-in functionalities that simplify task management and interfacing with other devices.

GPUs offer the largest number of inexpensive cores in a single unit (e.g., up to more than 5000 cores in the commercially available GeForce Titan Z offered by NVIDIA Corporation). GPU clock speeds are comparable to DSP processors (e.g., in 1 GHz range), but suffer from the limited amount of shared memory per core. GPUs implement single instruction, multiple data (SIMD) architectures, which cause all cores to run the same instruction in each cycle. Therefore, algorithms that require some serial work after a short amount of parallel work achieve significantly lower performance compared to completely parallel approaches, for the same amount of total work. An example of a commercially available GPU running 1536 cores at a clock speed of 1 GHz is the GeForce GTX 770 offered by NVIDIA. However, NVIDIA strongly recommends the use of Tesla GPUs for high performance computation.

FPGAs comprise of a pool of logic gates, memory blocks and simple DSP units that can be "wired up" programmatically. FGPAs offer a large amount of fast distributed memory and DSP units. The clock speed of an FGPA depends on the implemented circuit, but is typically lower than the other three non-quantum technologies discussed herein. For example, a clock speed of about 200 MHz is a reasonable clock speed in many cases. There is a relatively small limit on the number of times an FPGA can be programmed (roughly 100,000 times), so applications that require switching between multiple designs on-demand should utilize multiple FPGAs. An example of a currently available high performance FPGA is Xilinx's XC7VX485T, which has approximately half a million logic cells and flip-flops, more than one thousand 36 Kb memory blocks and 2800 DSP units.

Figure 2:
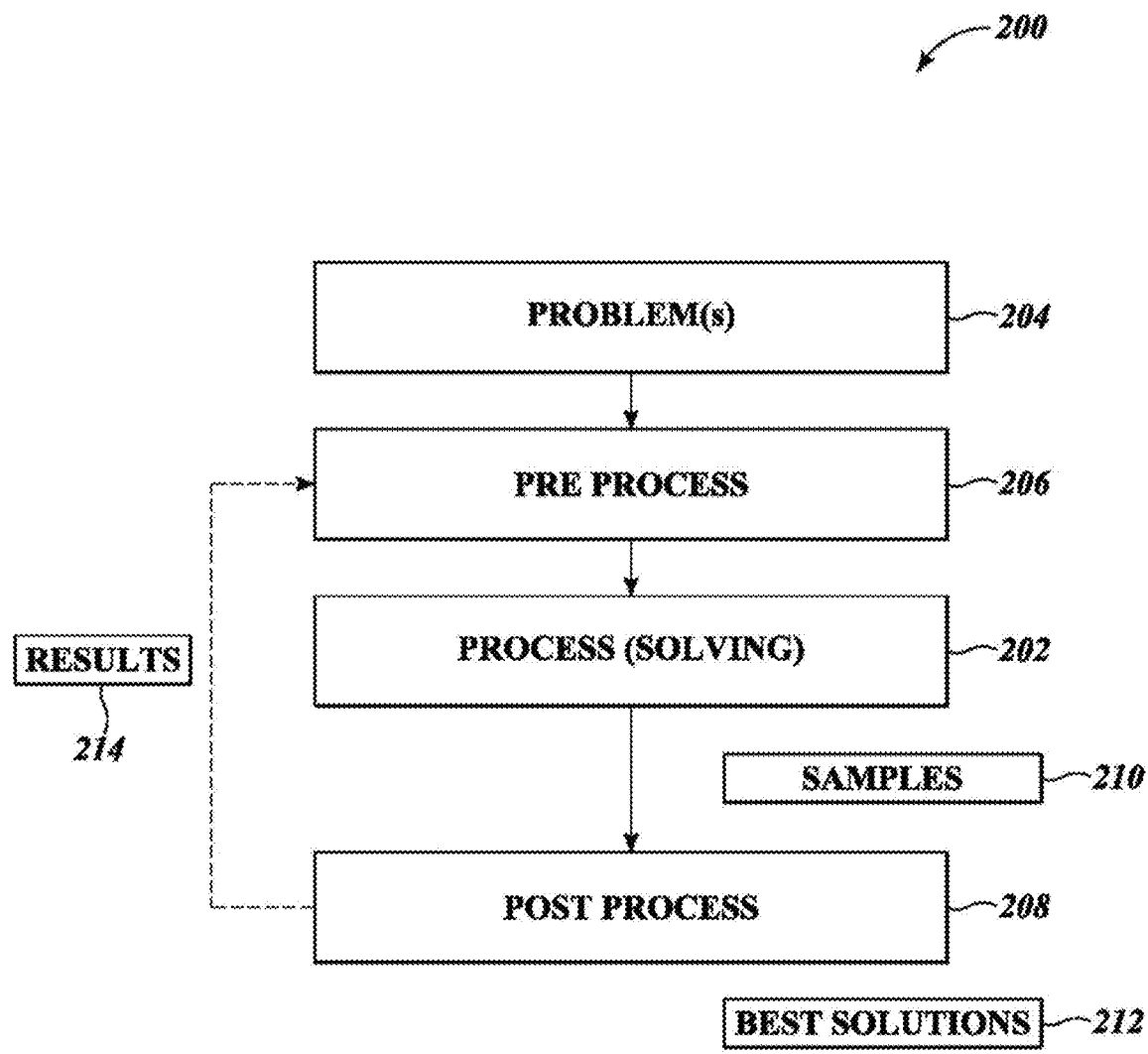
FIG. 2 is a high level schematic diagram of a relationship between pre-processing, processing, post-processing and optionally auxiliary processing implemented in the system of FIGS. 1A and 1B, in accordance with the presently described systems, devices, articles and methods.

FIG. 2 shows a high level relationship between various aspects of the operation of the computational system of FIGS. 1A and 1B.

In particular, the computational system performs processing 202 in the form of solving submitted problems 204, typically via one or more of solvers, for instance one or more of a plurality of heuristic optimizers executed via hardware resources.

In preparation to performing the processing 202 on each problem 204, the computational system may perform pre-processing 206. As discussed in detail in reference to other Figures (e.g., FIGS. 3A and 3B), the pre-processing 206 may, for example, include one or more of format checking, problem representation generation, solver selection, and/or interface conversion. As discussed in detail in reference to other Figures (e.g., FIGS. 3A and 3B), the pre-processing 206 may, for example, be performed by various processors or systems, and/or may be performed by various logical abstractions in the instructions sets or software modules. For instance, some pre-processing 206 may be performed by the job manager hardware, executing job manager software, while other pre-processing may be executed by solver hardware executing solver specific pre-processing instructions or software modules.

Subsequent to performing the processing 202 on each problem 204 or representation thereof, the computational system may perform post-processing 208. As discussed in detail in reference to other Figures (e.g., FIGS. 3A and 3B), the post-processing 208 may, for example, include evaluating various samples or tentative responses or answers 210 to determine a solution for each iteration of solving performed on a problem, and/or evaluating various potential solutions to determine a best solution 212 for the problem 204. As discussed in detail in reference to other Figures (e.g., FIGS. 3A and 3B), the post-processing 208 may additionally include modifying a problem 204 based at least in part on results 214 to a previous processing for another iteration of processing. As discussed in detail in reference to other Figures (e.g., FIGS. 3A and 3B), the post-processing 208 may, for example, be performed by various processors or systems, and/or may be performed by various logical abstractions in the instructions sets or software modules. For instance, some post-processing 208 may be performed by the job manager hardware, executing job manager software, while other post-processing 208 may be executed by solver hardware executing solver specific post-processing instructions or software modules.

In some implementations, the computational system may assess the performance of different solvers on various types of problems, which may be used to refine or improve the selection of solvers for subsequently submitted problems.

FIGS. 3A and 3B illustrate various instructions sets or software modules and processes (collectively 300), including various abstraction layers, for execution by the computational system 100 (FIGS. 1A and 1B) in problem solving, according to the presently described systems, devices, articles and methods.

Server instructions or software module 302 may be executed, for instance via server hardware 110 (FIGS. 1A and 1B) to implement a server, for instance a Web server. The Web server allows the submission of problems of various types, as well as providing the results and/or solutions to the submitted problems. The Web server may queue the submitted problems 304 for solution via pre-processing, processing and post-processing.

A set of job manager instructions or software module 306 may be executed, for instance via job manager hardware 112 (FIGS. 1A and 1B) to implement a job manager. The job manager may perform job management on submitted problems via the problem queue, via pre-processing and post-processing. It may also cause the processing of problems or the processing of representations of problems by one or more solvers via one or more solver resources 130, 140, 150, 160, 170 (FIGS. 1A and 1B).

The job manager may verify a format of each submitted problem, determining whether the problem is suitable for solving via the computational system. The job manager may identify the most appropriate solver(s) for each submitted problem. As previously explained, the job manager may use information about previous attempts to select portfolios of solvers to run in parallel based on problem type or features. In some instances, the job manager may select two or more solvers for a particular problem, run the selected solvers in parallel and return an answer. Where the job manager may gather results from the processing by the solvers, the job manager may select a best answer. A best answer may be, for instance, an answer from the solver that finishes first with a satisfactory solution, or an answer from the solver that produces the best or closest solution within a fixed time. Additionally, the job manager may slice jobs and handle high level communications between various ones of the solvers.

In particular, the job manager instructions or software module 306 may include a format checker set of instructions or software module 308. The format checker set of instructions or software module 308 performs pre-processing on each submitted problem, analyzing the submitted problem to determine whether the submitted problem is a suitable type of problem for the computational system. If the submitted problem is not a suitable type of problem for the computational system, the format checker set of instructions or software module 308 may cause an appropriate notification to be provided to the end user 102 (FIGS. 1A and 1B) or end user device 104 (FIGS. 1A and 1B) which submitted the respective problem, for example via the Web server instructions or software module 302.

The job manager instructions or software module 306 may include a multiple representation generator set of instructions or software module 310. The multiple representation generator set of instructions or software module 310 performs pre-processing on each submitted problem, producing multiple representations of the submitted problem.

The job manager instructions or software module 306 may include a type dependent task dispatcher set of instructions or software module 312. The type dependent task dispatcher set of instructions or software module 312 causes the various representations of the submitted problem to be sent to solvers for solving. The type dependent task dispatcher set of instructions or software module 312 may, for example, select an appropriate one or more solvers for each submitted problem, the solvers selected from a plurality of available solvers. Selection of appropriate solvers may include selection of specific solver algorithms as well as selection of specific types of hardware resources (e.g., quantum processor 130, microprocessor 140, FPGA 150, DSP 160, GPU 170 (FIGS. 1A and 1B)) to execute the selected solver algorithms.

The job manager instructions or software module 306 may include a selection solution set of instructions or software module 314. The selection solution set of instructions or software module 314 performs post-processing on results or solutions for each submitted problem, producing a best result or best results from the returned results. The selection solution set of instructions or software module 314 may employ a variety of techniques in selecting a best solution, which are generally discussed herein. For example, one technique may include selecting the median solution from a plurality of solver iterations executed on the particular problem.

The job manager instructions or software module 306 may include a modify problem set of instructions or software module 316. The modify problem set of instructions or software module 316 may modify a problem based on results or samples from a previous iteration of processing or solving performed on the problem. As such, the modify problem set of instructions or software module 316 may be considered post-processing since information from a previous iteration is being used to refine the problem or representation of the problem, and is illustrated as such in FIGS. 3A and 3B. The modify problem set of instructions or software module 316 may also be considered pre-processing, since the problem is being modified or re-represented for solving via one or more solvers. The denomination of the modify problem set of instructions or software module 316 as either pre-processing or post-processing should not be considered limiting.

The job manager instructions or software module 306 may optionally include an assess and improve selections set of instructions or software module 318. The assess and improve selections set of instructions or software module 318 may employ various techniques. Such may, for example, improve subsequent selection of solvers for subsequently submitted problems. As such, the assess and improve selections set of instructions or software module 318 may be considered post-processing since information from a previous iteration is being used to refine the problem or representation of the problem, and is illustrated as such in FIGS. 3A and 3B. The denomination of the assess and improve selections set of instructions or software module 318 as either pre-processing or post-processing should not be considered limiting.

The job manager can perform computationally heavy work (e.g., ranking to predict and solver performance, generating multiple representations of a submitted problem, etc.). Other operations performed by the job manager such as pre-processing operations relative to the solver (e.g., format check) and post-processing operations relative to the solver (e.g., selecting a solution or best solution) tend to be more simplistic compared to pre-processing and post-processing operations performed by the solvers.

The job manager 306 may be considered as an abstraction layer in an overall computational scheme for the computational system 100. Thus, while some functions are illustrated in FIGS. 3A and 3B as being performed via the job manager 306, in some implementations, those functions could be performed by another abstraction layer or module. Thus, the denomination of a function or software module as being within the job manager 306 should not be considered limiting.

A set of interface conversion instructions or software module 320 may be executed, for instance via solver hardware 130, 140, 150, 160, 170 (FIGS. 1A and 1B). The interface conversion instructions or software module 320 may be specific to the selected solver(s), and may convert the representations of the problem into a format or form suitable for the selected solver(s). The set of interface conversion instructions or software module 320 prepare the problem for the processing or solving thereof via the respective solvers. Therefore, the set of interface conversion instructions or software module 320 are denominated as forming part of the pre-processing portion of the computational system 100 (FIGS. 1A and 1B).

A set of solver instructions or software module 322a-322d (collectively 322) may be executed, for instance via solver hardware 130, 140, 150, 160, 170 (FIGS. 1A and 1B), to process or solve the pre-processed problems. As previously noted, the job manager instructions or software module 306 may select the specific solver or solvers 322 for any particular problem. Example solvers include QUBO solvers 322a, satisfiability solvers 322b, graphical model solvers 322c, etc. 322d.

While not intended to be limiting, a number of solver algorithms and techniques are set out below. The solvers (i.e., solver instructions or software modules 322 as executed by the solver hardware resources 130, 140, 150, 160, 170) of the computational system 100/300 may implement any one, more or all of these solver algorithms or techniques. The computational system 100/300 may run a given problem by exploiting multiple solver software resources on various solver hardware platforms. The solvers may include sub-solvers running on different platforms, which may be ultimately responsible for solving the jobs or problems.

Given a problem of a particular format, the computational system 100/300 may provide alternative types, formats or classes of the problem to initiate the solving of the problem. The computational system 100/300 may be capable of solving a variety of different types or formats of problems. Two types, formats or classes of problems are quadratic unconstrained binary optimization ("QUBO") problems and satisfiability (SAT) problems. Another type, format or class of problems is graphical model (GM) problems. A graphical model encodes conditional independence that exists amongst variables of the problem where each variable represents a set of qubits coupled together as a chain. The graphical model problem allows for the application of additional techniques or methods at the level of sets or chains.

A number of techniques which may be employed by the computational system for solving QUBO, SAT and/or graphical model problems are discussed below.

Global Equilibrium Search (GES)

GES is a meta-heuristic algorithm that shares some similarities with simulated annealing methods or approaches. The GES algorithm accumulates a compact set of information about the search space to generate promising initial solutions for various techniques that require a starting solution, such as local search or tabu search. The GES algorithm is applicable to many discrete optimization problems: QUBO, MAX-SAT, QAP etc. and provides state-of-the-art performance in terms of both computational time and solution quality. The GES algorithm can be naturally extended for parallel computing as the GES algorithm performs search simultaneously in distinct areas of the solution space.

The Standard Simulated Annealing (SA) algorithm is a memoryless optimization approach in which the transitions between solutions are independent from the previous search states. The GES algorithm attempts to mitigate this shortcoming by using an adaptive memory structure to collect information about visited solutions, using this knowledge to control future transitions.

One variation of the SA algorithm is to provide weights corresponding to the importance of exploring particular areas in the energy landscape of the problem. Such an approach, referred to as "annealed importance sampling," may allow the system to avoid becoming biased to local optima and thus perform a more complete search.

One variation of local search may involve seeding quick runs of simulated annealing, using the samples returned by the quantum processor hardware. This approach should be strictly better than a purely classical approach, and if implemented with interleaving of processing and post-processing, should take no more than twice as long as Warhol simulated annealing, assuming the quantum processing is allowed to run no longer than the classical algorithm. Where the quantum processor hardware returns more samples than can be subject to Warhol simulated annealing in the allowed time, a subset with the lowest energies can be used as the seed.

The computational system 100/300 may employ post-processing via one or more FPGAs or GPUs to automatically fix quantum processing hardware solutions as the hardware solutions are read from the quantum processor hardware. It is preferable if such post-processing does not add or does not substantially add time to a duty cycle of the computational system. In other words, it is preferable that the post-processing takes less time than a single solution readout. For example, with current quantum processors the post-processing time should be about 0.1 ms or less. The processing time for future quantum processors may be even less. Thus, other post-processing options may be employed, for example, searching via a breadthwise Hamming distance, or greedily by energy.

When using GPUs, matrix-matrix operations on batches are much more efficient than matrix-vector operations on single samples. Thus, it may be advantageous to post-process an entire sampling batch at a time, rather than sample by sample.

Iterated Tabu Search (ITS)

The ITS approach is based on the multistart tabu search algorithm, however the starting solutions are not generated randomly but are instead perturbed in a specific way from found "good" solutions. The perturbation ensures that the algorithm moves to a different region of a solution space while attempting to preserve "good" patterns in the solution vector.

Fast Semi-Definite Programming (SDP)

An approximation may be generated based on a SDP formulation of a QUBO. The dual problem of a semidefinite relaxation of the original QUBO is solved and the obtained (continuous) solution is then discretized using some simple heuristics. The method may be faster than conventional SDP formulation, however it is unclear how fast this approach may be when compared to tabu-search type of algorithms.

Devour, Digest, Tidy-Up Heuristic (DDT)

The DDT approach employs a greedy heuristic where at every step certain bits of the solution vector are fixed based on a certain criteria. No more than 2 bits can be fixed at a time. Once a bit is fixed, that bit cannot be flipped again. Therefore, the set of possible modifications to a solution in DDT is a subset of possible modifications in a local search algorithm with a size 2 neighborhood. Each move picked by the DDT procedure or algorithm corresponds to an improved solution, however said improved solution does not necessarily correspond to the best solution in the neighborhood as not all possible moves are considered. Once a move is made, the corresponding bits of a solution are made "tabu" forever, eliminating therefore a subset of possibly improving moves.

Therefore, the DDT procedure or algorithm is likely to produce worse quality solutions than a simple local search, but such an approach may return results more quickly. In some implementations, the DDT may be used to generate fast initial solutions for other algorithms, fast initial solutions which are better than just random initial solutions. The DDT approach is likely more suited to large scale problems.

Hybrid Metaheuristic Approach (HMA)

The HMA is based on principals similar to those in GES. The algorithm consists of two "levels" of operation. A lower level algorithm is designed to intensively explore a specific area of the solution space, taking the form of a conventional local-search based algorithm (e.g., tabu search). An upper level algorithm receives the information obtained by the lower level procedure and then guides and coordinates the distribution of search efforts across the solution space, e.g., tries to identify promising areas, decides which of those promising areas to explore and to what extent to explore. The upper level algorithm runs the lower level algorithm starting from solutions the upper level algorithm determines. The upper level algorithm maintains an adaptive memory structure holding information about the solutions encountered by the algorithm during the search.

In some implementations, the upper level procedure is implemented as an evolutionary type of algorithm. A set of best diverse solutions found during the search is maintained and a new starting solution for a lower level procedure is picked by combining components from two "parent" solutions from this set. The combining strategy is implemented via path-relinking. The new solutions obtained by lower level procedures are evaluated based on their "goodness" and are either added to the elite set of the solutions or discarded. The "goodness" of a solution may be defined by combining both an objective function value and the diversity from the solutions that are already in the elite set. The distance between two solution vectors may be defined simply by the Hamming distance, or more creatively by taking into account a contribution of each variable to the objective function value (e.g., how much would the objective value change if that variable were flipped). The lower level procedure may be implemented with a tabu search.

Low-Treewidth Large Neighborhood Local Search (LTLNLS)

Sparse QUBOs may be approached using an LTLNLS technique. Starting from an initial configuration, a subset of variables having low tree-width are identified and minimized exactly within this subset. The precise subset of variables can be dynamic with low-treewidth subgraphs determined by favoring certain interactions over others (e.g., interactions that have not yet appeared within any tree).

Blocking and Collapsing

The LTLNLS approach can be generalized as described in the paper: Venugopal, Deepak; Gogate, Vibhav, *Dynamic Blocking and Collapsing for Gibbs Sampling*, available via the Web at www.hlt.utdallas.edu/~vgogate/papers/uai13-2.pdf. This approach applies a large neighborhood local search (called, "blocking," in the paper) in combination with variable elimination (called, "collapsing," in the paper). For example, in the case of a bipartite graph, half of the variables may be eliminated analytically due to the natural occurrence of two disjoint sets.

Parallel Tempering

An efficient implementation of parallel tempering may also be included and may include defining an appropriate set of temperatures (usually including one lower temperature and one higher temperature) from which to sample multiple chains. This approach allows for an exchange of information between runs conducted at different temperatures and may provide solutions obtained from a more complete survey of the energy landscape of the problem. An approach related to parallel tempering is simulated tempering, wherein only one chain is considered.

Pre-Processing Routines

The pre-processing procedure proposed in a thesis authored by Gabriel Tavares, available via the Web at rutgers-lib-25771-PDF-1.pdf, uses ideas from DDT and other one-pass algorithms to fix some of the variables in the problem to 0 and 1. This proves that an optimal solution must have variables of those values. The approach also derives some relations between variables (e.g., equalities). This again proves that such relations must be present in an optimal solution. The procedure may help to reduce the effective dimensionality of the problem and may improve computational times.

A set of resource manager instructions or software module 324 may be executed, for instance via resource manager hardware 120 (FIGS. 1A and 1B) to implement a resource manager. The resource manager may perform resource management for operation of the solvers via various ones of the solver hardware resources 130, 140, 150, 160, 170 (FIGS. 1A and 1B). For example, the resource manager may parcel out and/or schedule hardware resources (e.g., computational time on hardware resources) to the various solvers 322 as processes 326a-326e (fifteen illustrated in FIGS. 3A and 3B, only five called out) execute on the solver hardware resources 130, 140, 150, 160, 170 (FIGS. 1A and 1B).

A set of post-processing instructions or software module 328a-328h (only eight shown, collectively 328) may be executed, for instance via solver hardware 130, 140, 150, 160, 170 (FIGS. 1A and 1B). The post-processing instructions or software module 328 may be specific to the selected solver(s), and convert the samples or results of the processing on the problem or problem representation into a solution. The post-processing instructions or software module 328 operates on the output (e.g., samples, results) of the processing by the solvers and thus is denominated as forming part of the post-processing portion of the computational system 100.

A heuristic optimizer working over a minor-embedded problem often returns proposed solutions that are either locally non-optimal or not in the code space (i.e., do not realize embedding chain fidelity). For this reason, the computational system provides a hybrid optimization approach employing a "black box" heuristic optimizer and an efficient heuristic post-processor that cleans and properly encodes the results of the heuristic optimizer. The term, "black box," is employed to indicate that in many instances the end users do not need to be aware of what specific heuristic optimizer is employed or how the heuristic optimizer operates.

Post-processing is performed to determine the solutions of the unembedded problem that correspond to the proposed solutions of the embedded problem returned by the heuristic optimizer. The most straightforward way of performing this post-processing is by rejection, i.e., by rejecting any sample returned by the heuristic optimizer that is not in the domain of the embedding mapping (e.g., any sample with a broken chain).

Another approach is majority vote. There are other computationally inexpensive and effective post-processing schemes. For example, for post-processing of the solution of SAT problems, a greedy descent and local search may be employed. Also available is variable clamping post-processing.

While not intended to be limiting, a number of post-processing algorithms and techniques are set out below. The post-processing instructions or software modules 328 as executed by the solver hardware resources 130, 140, 150, 160, 170) of the computational system 100/300 may implement any one, more or all of these post-processing algorithms or techniques. The computational system 100/300 may run two or more of these post-processing algorithms in parallel with one another.

Majority Vote

Majority voting instructions or software module 328a may implement a majority voting algorithm, for instance where the most common sample or result is selected as the best solution. Alternatively, a majority voting algorithm may be directed to error correction aiming to preserve the encoded sub space. For example, in the case of a broken chain of ferromagnetically coupled qubits, the most commonly occurring value (the "majority"), assuming repetitive encoding, is determined to be the correct value. Such an approach is typically easy and quick to implement, however it may be susceptible to error when the number of values considered is low, resulting in a potentially high likelihood that an incorrect value is determined to be correct. As in the case of any post-processing strategy where limited effort is expended, the quality of the results provided by a majority vote algorithmic approach may be unduly limited. Thus, other post-processing algorithms may be employed separately or in conjunction with a majority voting algorithmic approach.

Local Search

Local searching instructions or software module 328b may implement a combination of majority voting with a greedy local search. After applying majority vote or another post-processing method, the results may be refined by using a local search algorithm of arbitrary complexity (e.g., tabu search) in the unembedded problem space, using the hardware's proposed solutions as initial conditions. Provided that a running time of the local search algorithm is limited, this can provide a significant improvement in a small amount of time. The local search algorithm may or not be aware of the structure of the unembedded problem, depending on the specific application. For example, a local search SAT solver can be used as a post-processor for a SAT instance, and its knowledge of the problem structure can make it more effective than a context-free solver.

Markov Chain Monte Carlo (MCMC)

MCMC instructions or software module 328c may implement a Markov Chain Monte Carlo algorithm.

In sampling-based use cases, the goal is to draw (classical) Boltzmann samples at the programmed Ising energy function. Mapping of most real world problems into a quantum processor whose topology implements a bipartite graph often requires increasing a connectivity on the chip or quantum processor. Connectivity may be increased by implementing the concept of logical qubits or "chains" of qubits, where a plurality of qubits are strongly coupled together and represent a single problem variable, and denominated herein as a logical qubit since the plurality of physical qubits in any given chain operate or function as a single qubit, albeit with a higher connectivity that would otherwise be available to a single physical qubit. For example, see U.S. patent application Ser. No. 14/339,289, filed Jul. 23, 2014. The logical qubits or chains of strongly coupled qubits may support long range interactions in the energy function. Typically, however, we are not interested in excited states which break chains since chains are an artifact required for implementation on a quantum processor whose topology implements a bipartite graph. Unlike the previously described optimization examples, the post-processing involving MCMC attempts to make samples approach a more Boltzmann distribution by running Gibbs sampling (e.g. blocked Gibbs) on hardware samples. This "cleans" up hardware samples, thereby making further downstream processing more likely to succeed.

Markov Chain Monte Carlo methods may perform better the closer the samples resemble a Boltzmann distribution. At little additional cost, we would obtain samples which approach a Boltzmann distribution, making subsequent processing more effective. This may enable better estimates for MC approximations of the partition function, the number of ground states, expectations, etc.

Another approach is to run extended MCMC chains, initialized based on samples returned from a quantum processor, such as one or more of quantum processors 132 (FIGS. 1A and 1B), from which multiple samples are drawn. Assuming that multiple gauges are run on the same problem, the programming time for each new gauge is significant, and annealing and readout, e.g., of $10^{4}$ samples, is far from instantaneous. During this time, a GPU or FPGA implementation, such as GPUs 172 or FPGAS 152 (FIGS. 1A and 1B), could run Gibbs sampling (e.g. blocked Gibbs sampling) initialized from the last batch of $10^{4}$ samples. Assuming that many iterations of Gibbs sampling can be run in the time required to fully extract the results of the next gauge, multiple decorrelated samples produced by this classical MCMC could be returned to the user for each sample produced by the hardware.

Greedy Descent

Greedy descent instructions or software module 328d may be employed after the application of any other post-processing method to further refine the results. The greedy descent algorithm iteratively makes bit flips that improve an objective or evaluation function in the proposed solutions until no more bit flips are possible. An algorithm for performing greedy descent with respect to a quantum processed solution may, for example, include instructions to:

1. Determine a set of qubits which can improve a solution when the qubits are flipped individually;
2. Randomly flip each of these qubits with 50% probability;
3. Repeat the process until it converges or reaches a maximum number of iterations (e.g., 5*number of qubits);
4. Return the best solution found during the descent.

Local Field Voting

Local field voting instructions or software module 328h may implement a local field voting algorithm, an approach subsumed by greedy descent. If the hardware resources (e.g., microprocessor 140, FPGA 150, DSP 160, GPU 170 (FIGS. 1A and 1B)) return a solution including a broken chain whose neighbouring chains are all intact, the optimal value of the respective variable in the broken chain may be decided based on the fixed value of the analogous variables in the neighbouring chains. The approach can also be used if some neighbouring chains are not intact. The method can be iterative.

Variable Clamping

Variable clamping instructions or software module 328e may implement a variable clamping algorithm. If the hardware resources (e.g., microprocessor 140, FPGA 150, DSP 160, GPU 170 (FIGS. 1A and 1B)) return solutions involving chains that are always or almost always intact and that favour one particular configuration over the other, we may "clamp" variables in the chain and re-run the problem (i.e., hold one or more variables at particular values while allowing other variables to accommodate the fixed variables). This approach may be re-run multiple times until satisfaction criteria are met. For example, the system may: (1) apply a local h to the members of the chain in order to make it inflexible, or (2) set it as a constant in the Ising problem, and convert the incident J entries to h entries on those chains coupled with the variable being clamped. The system can repeat this approach until all chains are satisfactorily decided.

Variable Branching

Variable branching instructions or software module 328f may implement a variable branching algorithm. If the hardware resources (e.g., microprocessor 140, FPGA 150, DSP 160, GPU 170 (FIGS. 1A and 1B)) return a solution including at least one variable that is not satisfactorily decided, we can branch on it, splitting the problem into two sub problems: a first sub problem where the variable is assumed to take a particular binary value, and a second sub problem where the variable is assumed to take the opposing binary value from that in the first sub problem. This algorithmic approach is feasible as long as the implementation only branches on a very small number of variables.

Rejection

Rejection instructions or software module 328g may implement a rejection algorithm for instance, where any sample from the heuristic optimizer that is not in the domain of the embedded mapping (i.e., any sample with a broken chain) is rejected or not considered further. In cases where the probability of rejecting a sample returned is high, e.g., due to broken chains, alternative approaches as discussed herein to perform error correction or to repair the broken chain may be employed.

EXAMPLE

Some exemplary satisfiability (SAT) problems include: NAE3SAT (Not-All-Equal-3-SAT) and 2in4SAT (2-in-4-SAT). Given a conjunction of clauses, each containing exactly three literals, a NAE3SAT problem can be defined as finding an assignment such that each clause contains at least one true and at least one false literal. Given a conjunction of clauses, each containing exactly four literals, a 2in4SAT problem can be defined as finding an assignment such that each clause contains exactly two true and two false literals.

NAE3SAT and 2in4SAT are two types of constraint satisfaction (i.e., satisfiability) problems that may be embedded on quantum processor hardware. Chains of qubits or logical qubits may be employed to embed such problems in a quantum processor whose topology implements a bipartite graph, however there is a limit on the size of a problem that may be embedded. The computational system 100 (FIGS. 1A and 1B) may employ decomposition on problems that would otherwise be too large to be embedded on the quantum processor hardware.

The various post-processing techniques described above are also particularly useful in improving results which include broken chains. A number of factors can cause a chain to break, for example, a coupling strength between qubits of the chain may be set to a value that is too low to sustain the chain. Consequently, in practice, there are often broken chains in results returned from hardware resources. Post-processing techniques may improve such results, by for example, rejection (i.e., discarding results including a broken chain) or by error correction.

Also for example, majority voting post-processing may be employed in error correction, e.g., to repair broken chains by assigning the corresponding logical variable the value given by the majority of constituent chain members where any ties between values may be decided randomly. Also for example, greedy descent post-processing may be applied after or in conjunction with majority voting post-processing. Such an approach may apply single bit flips in the unembedded problem and select those configurations which improve an objective or evaluation function. These flips are made greedily, until no more local improvement is possible.

As a further example, local search post-processing may be employed. For instance, a local search algorithm may be invoked to further improve or refine results received from a hardware resource. The running time of the local search algorithm should ideally be relatively small.

For instance, if applying a local change involves deciding how to assign a logical variable represented by a chain X, each neighboring chain Y asserts a value J on X, which can be inferred based on either Y's majority vote or by Y's proportional representation.

The above "guessing" approach may be taken further, reducing the problem to an Ising model based on only variables represented by broken chains. If there are, for instance, two broken chains that have at least one connection between each other, an Ising interaction may be added between corresponding logical variables, and the reduced Ising problem may then solved as part of post-processing in software.

The post-processing may occur on a variety of different hardware, at various points in the computational system. For example, the post-processing may occur on the quantum processor application programming interface (QPAPI) level, the SAPI level, or at the non-quantum processor level (e.g., FPGAs). The QPAPI is a Web services API that exposes quantum processor instructions as Web services.

As indicated by the above examples, mapping of most real world problems into a quantum processor whose topology implements a bipartite graph requires increasing the connectivity on the chip, which is currently done by introducing chains, as previously described. As previously discussed, in reality, chains may often break for a variety of reasons.

When breakage on the chain occurs, the corresponding sample could either be discarded or mapped to "a close feasible state", (i.e., a state with no breakage). The former choice leads to a wasting of samples before a feasible state is achieved. The latter option introduces some overhead in order to fix or improve the sample through post-processing, as previously described. For example, majority voting on the chain may be performed to map the broken chain to their closest (in terms of Hamming distance) feasible state.

In practice, some of the samples returned by the hardware (e.g., quantum processor) may not be locally optimal. For optimization problems where the goal is to determine a global optima or at least a good local optima, only locally optimal states are considered. Similar to broken chains, non-locally optimal samples offer two options: i) discard the samples, or ii) perform a local search to fix the samples. With regards to the latter option, an example of a post-processing approach to map a non-locally optimum state to a candidate solution is to run a local search to find a close locally optimal state.

In an alternative approach, it may be possible to fix broken chains and non-locally optimal samples without introducing any overhead. This may be achieved by post-processing the samples as the samples arrive. Since the samples arrive one at a time, the post-processing could be performed while the next sample is being generated. The post-processing of the samples may, for instance, occur on one or more FPGA communicatively coupled to the source of the samples (e.g., quantum processor).

The SAPI and QPAPI may be configured to accommodate such an approach, for example, through the use of a flag which signals that a sample returned from the hardware is to be post-processed in order to ensure that the sample is locally optimal. By default, the flag may be set to true (i.e., every sample is flagged to be post-processed to ensure it is locally optimal). Samples with broken chains may be flagged. Flagged samples may be post-processed to ensure local optimality. For example, broken chains flagged as non-locally optimal may be passed to a non-quantum hardware resource (e.g., FPGA) and majority voting may then be performed on the chain to repair the broken chain, and additionally, a local descent from the repaired chain may be invoked.

In another approach to repair a broken chain, the value (e.g., 0 or 1, +1 or −1) that minimizes the energy is selected. This approach can be applied greedily or recursively, similar to majority vote. This approach is similar in some respects to following the local field, and is optimal in special cases (i.e., it will always provide a minimum energy solution if broken chains are not neighbors).

If the problem being solved on the quantum hardware is a CSP type problem with small local constraints, a chain typically breaks due to taking on different values in an attempt to satisfy different constraints. For example, in NAE3SAT problems, a hardware resource such as a quantum processor might break a chain by setting a variable to 0 to satisfy a first clause and setting the same variable to 1 to satisfy a second clause. In this case, resolving chains by looking at values of neighboring chains is unlikely to be a useful approach. NAE3SAT and 2in4SAT problems have a relatively direct conversion to an Ising problem. 3SAT, however, could immediately benefit from a strategy in which a hardware result is mapped to a "nearby" valid 3SAT answer.

Additionally, the QPAPI or the quantum processor may measure a local excitation value, for example for determining for a given set of solutions the percentage of spins which can be flipped in isolation to improve the energy. This value provides the opportunity to improve the answers produced by post-processing. This value also gives provides an opportunity to measure error susceptibility of a particular problem or type of problem, and to measure possible readout errors. This may employed to make better selections for solving future problems.

Optionally, a set of interleaver instructions or software module 330 may be executed, for instance via hardware resources (e.g., microprocessor 140, FPGA 150, DSP 160, GPU 170 (FIGS. 1A and 1B)) to cause an interleaving of post-processing operations with processing operations (i.e., generation of samples by the quantum processor(s)). The set of interleaver instructions or software module 330 may cause the post-processing operations to at least partially, or even fully overlap with the generation of samples. For instance, the set of interleaver instructions or software module 330 may cause post-processing to be performed on an nth sample or result from the quantum processor while the quantum processor is generating an n+1th sample or result. The set of interleaver instructions or software module 330 may time the post-processing such that each iteration partially overlaps with iterations of the solving. The set of interleaver instructions or software module 330 may control the post-processing for an n sample or result to complete before or at the time of completion of generation of an n+1th sample by the quantum processor. This approach can significantly reduce overall time to produce an answer or solution.

For example, interleaving may be applied in running extended MCMC chains, initialized based on the samples from the quantum processor hardware, from which multiple samples are drawn. For instance, if running multiple gauges on the same problem, the programming time for each new gauge is significant, and annealing and readout of, for example 10^4 samples is far from instantaneous. During this time, a GPU or FPGA implementation could run Gibbs sampling (e.g. blocked Gibbs sampling) initialized from the last batch of 10^4 samples. Assuming that many iterations of Gibbs sampling can be run in the time required to fully extract the results of the next gauge, multiple decorrelated samples produced by this classical MCMC could be returned to the user for each sample produced by the quantum processor hardware. Preferably, the post-processing operations will not add time to a duty cycle of the computational process, the post-processing operation taking less time than a single solution readout from the quantum processor (e.g., less than 0.1 ms). Since GPU matrix-matrix operations on batches are more efficient than matrix-vector operations on single samples, it may be advantageous to post-process an entire sampling batch at a time rather than individual samples.

In many instances, a quantum processor can very rapidly produce high quality or reliable results. Briefly put, the quantum annealing hardware can very quickly find solutions that are within a small difference epsilon $\epsilon$ from optimal, but because of ICE and noise, the cost getting from $\epsilon$ to an optimal solution can be relatively high. The small difference $\epsilon$ is a number based on a model of errors due to ICE; and is proportional to $\sqrt{M}$, where M is the number of qubits and couplers in the hardware graph. The system may take advantage of this ability of the quantum hardware by using a hybrid computing approach in which one or more quantum processors initially determine a reduced set of solutions, which are then post-processed to further increase a reliability of the solutions, and for instance determining a best solution.

It is possible to let a quantum processor evolve for a long time to reach the ground state of the problem Hamiltonian or let the quantum processor evolve for less time and reach a different state short of the ground state. This different state may approximate the ground state. An analog computer including a quantum processor that finds the approximate ground state is useful. These approximate ground states can lead a computer to find the ground state using methods of post-processing described here, in a technique referred to herein as approaching epsilon. A question is how good an approximation of the ground state is needed for the results to be useful.

Solutions within a quantifiable distance of the ground state are useful approximate solutions to the problem embodied in the problem Hamiltonian. The problem Hamiltonian includes a ground state, and wherein the ground state has the lowest energy among the states of the problem Hamiltonian. However, a ground state may be degenerate or not.

Evolving the quantum processor for a time T may include evolving the quantum processor for a time T wherein the time T is not sufficient to reach the ground state of the problem Hamiltonian but is sufficient to reach a set of excited states above the ground state.

Evolving the quantum processor for a time T may include evolving the quantum processor for a time T wherein the time is sufficient to reach one or more states near the ground state of problem Hamiltonian. Here the term "near" means within an amount of energy, $E_R$, away from the ground state.

The amount of energy away from the ground state can be calculated many different ways under different assumptions. In one example, the amount of energy away from the ground state is proportional to the product of a constant, a term describing the error model, and a term describing the error in the device parameter. Devices may include qubits or couplers in the analog processor. For example, $$E_R \propto k \cdot EM \cdot ED$$

Here k is constant, EM summarizes the error model, and ED summarizes the error in the devices. Examples of the constant, k, are of order 1. Examples of the error model term include an expression proportional to the number of devices in the quantum processor. Examples of the error model term include an expression proportional a factor sub-linear in number of qubits, linear in the number of qubits, and polynomial in the number of qubits. For a hardware graph, examples of the error model term include terms that assume errors in the Hamiltonian of the quantum processor are uncorrelated. A summation of uncorrelated errors leads to an overall factor that is proportional to the square root of the number of terms in the summation. An example is:

$$EM \propto (M)^{1/2}$$

where M is approximately the number of qubits and couplers in the hardware graph. For a hardware graph of an exemplary quantum processor whose topology implements a bipartite graph, examples of the error model term include:

$$EM \propto (4N)^{1/2}$$

where 4N is approximately the number of qubits and couplers, in the hardware graph in terms of the number of qubits, N. For a complete hardware graph $K_N$ examples of the error model term include $$EM \propto \left(\frac{1}{2}\right)^{1/2} N$$

Examples of the error model term include an expression proportional to the number of devices. For a hardware graph of an exemplary quantum processor whose topology implements a bipartite graph, examples of the error model term include:

$$ED \propto \delta M_{AFM} I_P^2$$

where $\delta$ is a value less than one and greater than zero.

The balance of the expression is the maximum energy scale of the analog process and specifically shown is the energy scale for a superconducting quantum processor comprises of rf-SQUID qubits and couplers.

Examples of $\delta$ include 0.01, 0.05, and 0.1. The term $\delta$ is the error in the specification of a parameters of the quantum processor. For example, for a single qubit bias term, h, the error in the bias is $\delta h$.

The computational system 100/300 may further include one or more random number generators 332 operable to produce either pseudo-random or truly random numbers. Random numbers may be useful to drive probabilistic computations, such as those in post-processing. In particular, pseudo-random numbers may be provided via a classical computer program (e.g., by calling random number generator functions provided in MATLAB, Python, etc. or a proprietary classical function). Truly random numbers may be provided by a quantum source. A quantum random number generator may generate a uniform distribution of random bits. A quantum random number generator may generate a distribution of truly random real numbers by collecting contiguous sub-sequences of bits from a distribution of random bits. Examples of a quantum random number generator include commercial devices including the qStream computing appliance from QuintessenceLabs Acton, ACT 0200, Australia and the Quantis family of computer peripherals (e.g. USB devices and PCI cards) from id Quantique SA, Carouge GE, Switzerland. For example, a quantum random number generator might take the form of an external piece of hardware (e.g., USB, PCI, PCI Express, etc.) that is integrated with a quantum processor system and/or take the form of one of the quantum processors 130 (FIGS. 1A and 1B) of the computational system 100. Any variety of random number generators may be employed.

The computational system 100/300 may further include a quantum processor error correction set of instructions or software module 334 which performs error correction or "shimming" of the quantum processor. The quantum processor error correction set of instructions or software module 334 may, for example, identify biases in quantum devices toward +1 or −1 states, and correct for such bias. The quantum processor error correction set of instructions or software module 334 may be executed by a variety of processor based devices, for instance a control system or computer associated with a particular quantum processor that is the subject of the error correction.

Figure 4:
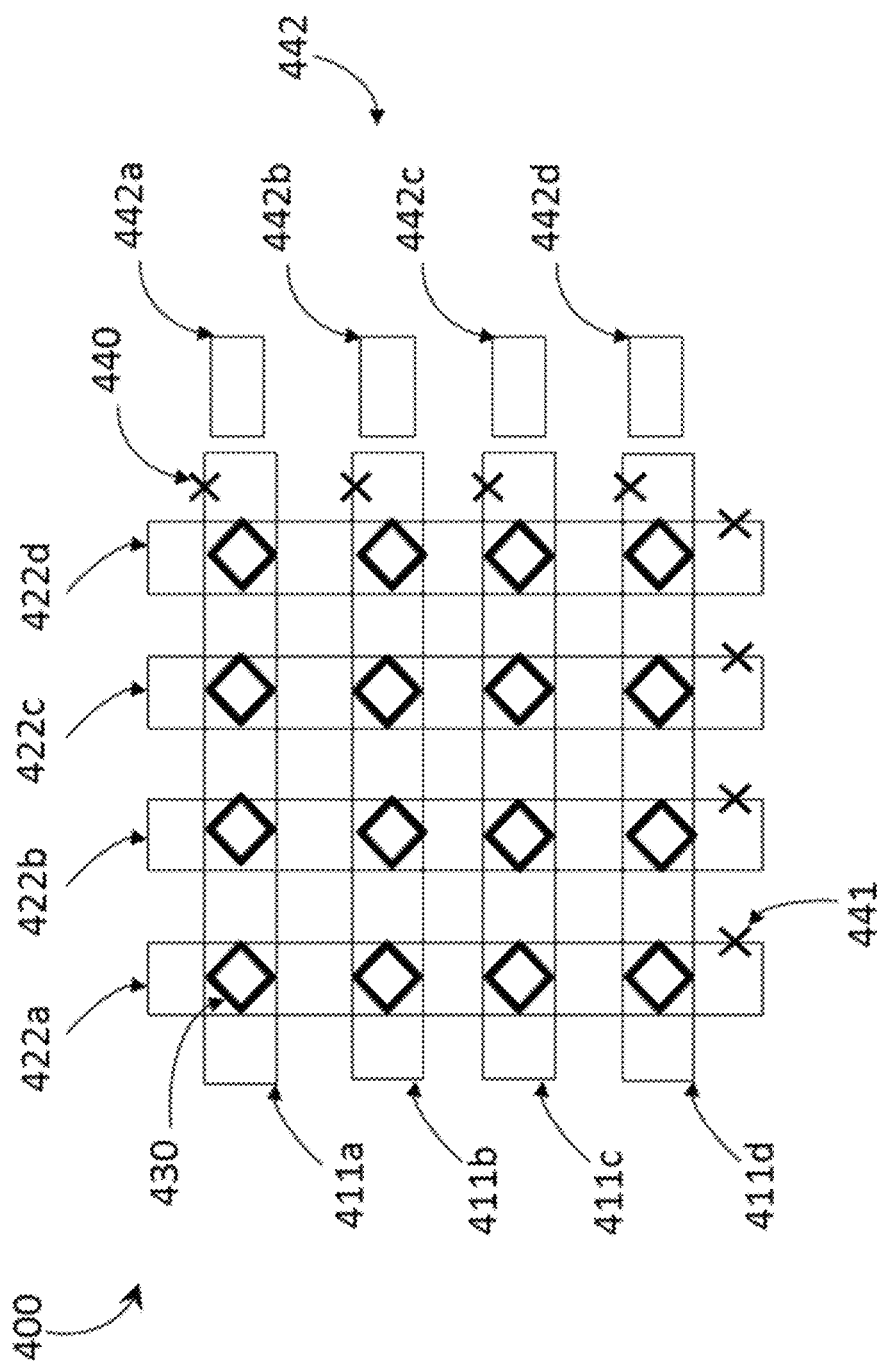
FIG. 4 is a schematic diagram of a set of qubits of a quantum processor, in accordance with the presently described system, devices, articles and methods.

FIG. 4 is a schematic diagram of a set 400 of qubits forming the basis of a quantum processor architecture in accordance with one or more implementations. Specifically, FIG. 4 illustrates the set 400 of qubits including eight qubits arranged as described in U.S. Pat. No. 8,421,053, incorporated herein by reference. As shown, qubits 411*a*, 411*b*, 411*c* and 411*d* (collectively qubits 411) of a first subset of qubits each have a respective horizontally oriented longitudinal or major axis along which the superconductive paths of the qubits 411 extend, the major axes of the qubits 411 laid out at least nominally parallel to each other. Also as shown, the qubits 422*a*, 422*b*, 422*c* and 422*d* (collectively qubits 422) of a second subset of qubits each have a respective vertically oriented longitudinal or major axis along which the superconductive paths of the qubits 422 of the second subset of qubits extend, the major axes of the qubits 422 laid out at least nominally parallel to each other. The longitudinal or major axis is the axis along which the longest dimension of the loop of a qubit generally extends, whether or not the qubit has one or more bends or changes in directions between ends. For instance, where a loop has an "I-shaped" profile (as shown), the major axis ends between the top and the bottom of the "I", that is, along the longest dimension or length of the loop.

The qubits 411 and the qubits 422 each have respective lateral or minor axes generally perpendicular to the major axis. While the qubits 411 and 422 are illustrated as being substantially rectangular loops, such is not intended to be limiting, and the qubits may have any other elongated form, for instance an oval. The major axes of the qubits 411 of the first subset of qubits are nonparallel (e.g., perpendicular) to the major axes of the second subset of qubits 422, and a portion of a qubit in the first subset of qubits crosses a respective portion of every qubit in the second subset of qubits. Each qubit 411*a*, 411*b*, 411*c* and 411*d* may be interrupted by a respective Josephson junction 440 (only Josephson junction 440 of respective qubit 411*a* is called out in FIG. 4 to reduce clutter). Each qubit 422*a*, 422*b*, 422*c* and 422*d* may be interrupted by a respective Josephson junction 441 (only Josephson junction 441 of respective qubit 422*a* is called out to reduce clutter). Multiple sets of qubits, such as set 400 of qubits illustrated in FIG. 4, may be tiled across an area of the quantum processor which represents the layout of qubits in the quantum processor architecture.

In some implementations, only qubits in one subset of qubits are communicatively coupled to a qubit in the other subset of qubits. That is, no pair qubits in the same subset of qubits is communicatively coupled (i.e., a pair of horizontal qubits or a pair of vertical qubits). Coupler 430 in FIG. 4 illustrates an example of a coupling device which couples qubit 422*a* to qubit 411*a* (i.e., qubits in different sets of qubits that cross one another). As shown, there is no pairwise coupling of qubits within the same subset of qubits in the illustrated implementation. In some implementations, quantum processor architectures may include overlapping qubits in the same subset of qubits, as well as qubits that are more strongly coupled to qubits in other sets of qubits. Examples of quantum processor architectures are provided in U.S. patent application Ser. No. 14/453,883, filed on Aug. 7, 2014, incorporated herein by reference.

The set 400 of qubits also includes a readout subsystem 442 that includes readout devices 442*a*, 442*b*, 442*c*, and 442*d* configured to read out the state of qubits 411*a*, 411*b*, 411*c*, and 411*d*, respectively of the first subset of qubits. In the embodiment shown in FIG. 4, each of readout devices in the readout subsystem 442 may include a respective DC-SQUID that is configured to inductively couple to the corresponding qubit. In the context of the set 400 of qubits of a quantum processor, the term "readout subsystem" is used to generally describe the readout devices 442*a-d* used to read out the final states or samples of the qubits (e.g., qubits 411 in the first subset of qubits) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in U.S. Patent Publication No. 2013/0278283, incorporated herein by reference.

In the implementation illustrated in FIG. 4, the readout subsystem 442 is positioned and operable to readout the states of only the qubits 411 in the first subset of qubits.

Figure 6A:
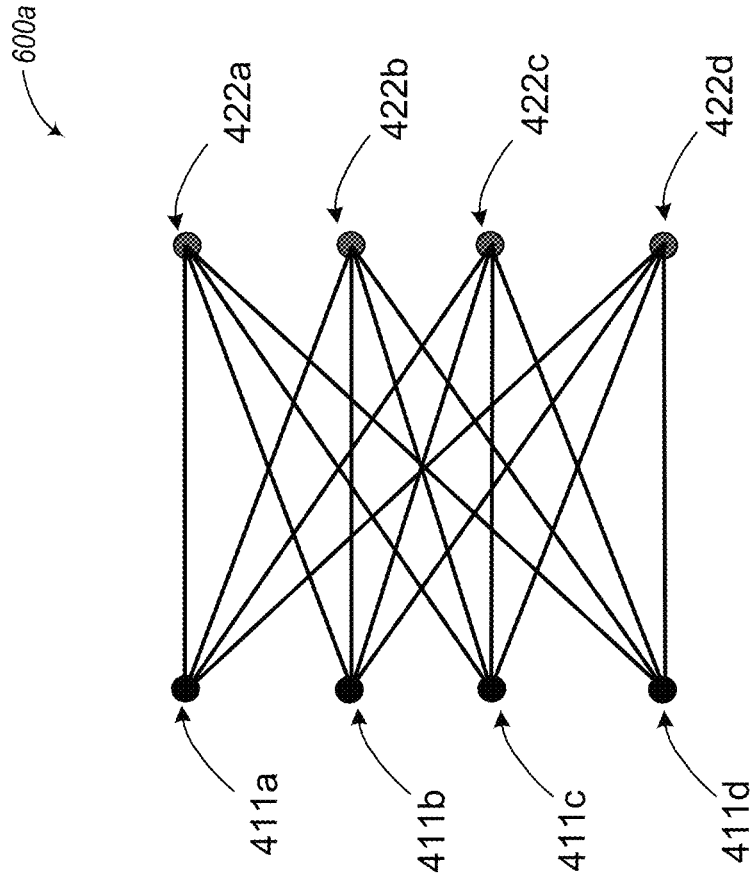
FIG. 6A is a diagram of a graphical representation of connections between qubits and couplers of the set of qubits of FIG. 4, in accordance with the presently described system, devices, articles and methods.

FIG. 6A illustrates a graph 600*a* representing the set 400 of qubits of FIG. 4. The set 400 of qubits corresponds to a complete bipartite graph $K_{4,4}$. In the graph 600*a*, qubits and couplers correspond to the vertices and edges, respectively. In other implementations, the readout subsystem 442 may be positioned and operable to readout one or more subsets of qubits in a quantum processor (e.g., ⅛ of the qubits, ⅙ of the qubits, ¼ of the qubits, ½ of the qubits, all of the qubits, etc.).

FIG. 6B illustrates a graph 600*b* representing an example set of connections between qubits. Graph 600*b* comprises 18 sets of 4-qubit arrays each, 610, 612, 613, 614, 615, and 616, 620, 622, 623, 624, 625, and 626, and 630, 632, 633, 634, 635, and 636. Each of the arrays can correspond, for example, to qubits 411a through 411d of FIG. 6A.

Each pair of 4-qubit arrays constitutes a unit cell, for example 4-qubit arrays 610 and 612 constitute unit cell 640. Intra-cell connections can be as illustrated in FIG. 6A. FIG. 6C illustrates an example arrangement 600c of inter-cell connections between qubits for the graph 600b of FIG. 6B. Graph 600b has treewidth 4. In other example arrangements, the inter-cell connections can have cross-connections, for example as illustrated in FIG. 6A.

A first set of qubits can comprise the qubit arrays 621 and 625. A second set of qubits can comprise the qubit arrays shown in FIG. 6B with the exception of qubit arrays 621 and 625.

As explained below in reference to FIG. 7, a quantum processor can be operated to generate samples, and the samples read for the first set of qubits (qubit arrays 621 and 625). The read samples can be processed to determine derived samples for the second set of qubits.

Figure 5:
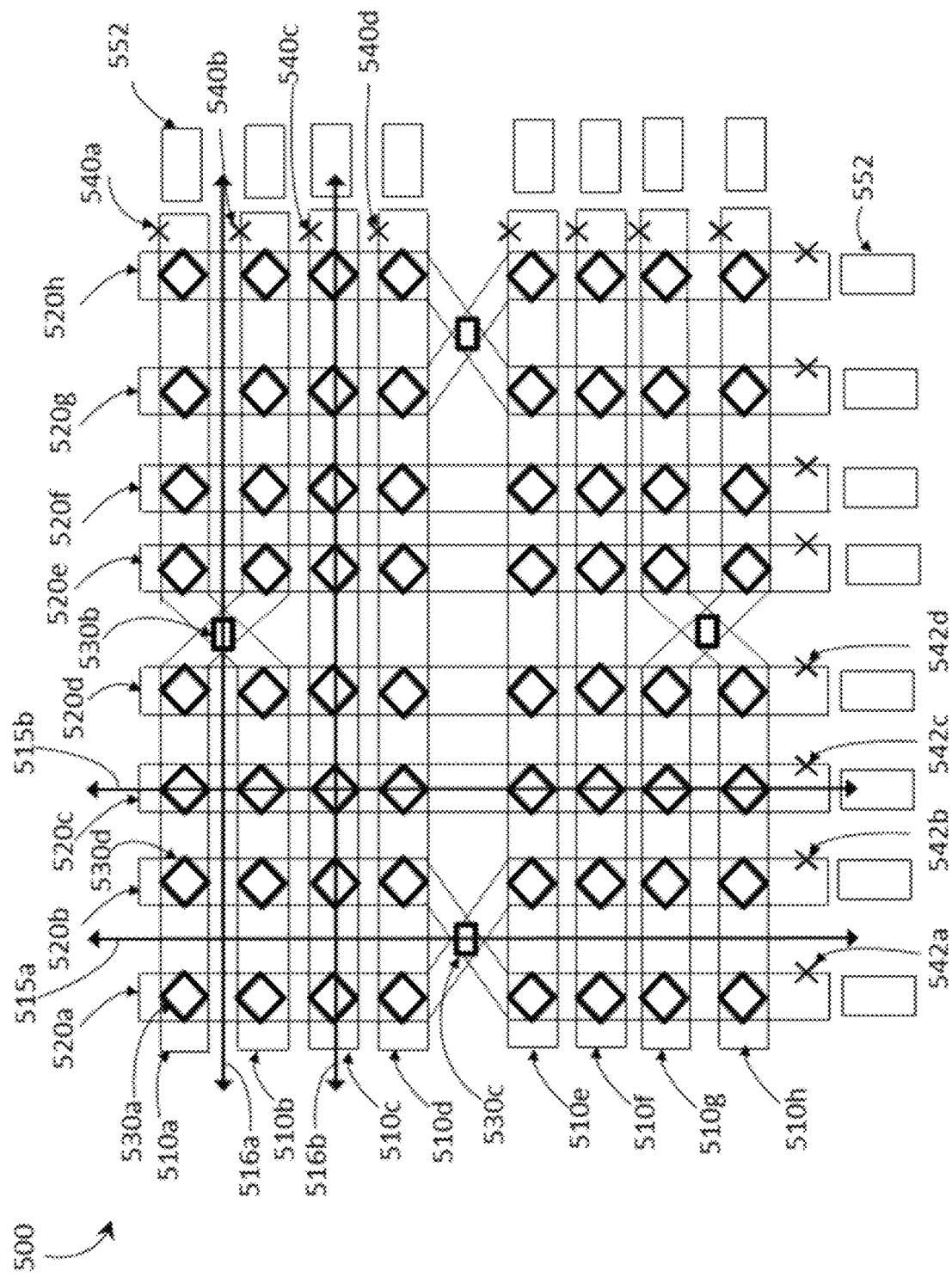
FIG. 5 is a schematic diagram of a set of qubits forming the basis of a quantum processor architecture in accordance with the present systems devices, articles and methods.

FIG. 5 shows an exemplary set 500 of qubits, a tiling of which may form the basis of a quantum processor architecture in accordance with the present systems and devices. Set 500 includes a first subset of qubits 510a-510h (collectively 510) and a second subset of qubits 520a-520h (collectively 520). While each subset is illustrated as having eight qubits, such is not limiting. In other implementations, each subset of qubits in a set may have a larger or smaller number of qubits, and the number of qubits in the second subset does not need to equal the number of qubits in the first set.

The qubits 510 of the first subset each have a respective longitudinal or major axis 515a, 515b (only two called out, collectively 515) along which the superconductive paths or loops of the respective qubits 510 of the first subset extend in a lengthwise direction of the qubit. Likewise, the qubits 520 of the second subset each have a respective longitudinal or major axis 516a, 516b (only two called out, collectively 516) along which the superconductive paths or loops of the qubits 520 of the second subset extend in a lengthwise direction of the qubit. The qubits 510 of the first subset have loops that are predominately or essentially parallel with one another, with the respective longitudinal or major axes 515a, 515b at least nominally parallel to each other. The qubits 520 of the second subset have loops that are predominately or essentially parallel with one another, with the respective longitudinal or major axes 516a, 516b at least nominally parallel to each other.

The longitudinal or major axis is the axis along which the longest dimension of the loop of a qubit generally extends, whether or not the qubit has one or more bends or changes in directions between ends. For instance, where a loop has a Z-shaped profile, the major axis ends between the top and the bottom of the Z that is along the longest dimension or length of the loop. The qubits 510 and the qubits 520 each have respective lateral or minor axes (not shown), respectively. The lateral axis is generally perpendicular to the major axis. While the qubits are illustrated as being substantially rectangular loops, such is not intended to be limiting, and the qubits may have any other elongated form, for instance an oval. As used herein and in the claims, the term, "essentially parallel" or "substantially parallel" means that a longitudinal or major axis of a respective elongated loop of each of at least two qubits is parallel with one another, without reference to any relatively shorter legs or portions of the elongated loops. Another way to describe the geometric relationship between qubits in a set, is that corresponding portions of the loops of the qubits are laterally spaced equally from one another, at least except at the portion where two of the qubits cross one another. Notably, at least one qubit 510b, 510h of the first subset is a mirror image of, or has reflection symmetry with, the qubit 510a, 510g, respectively, that the qubit 510b, 510h crosses. Likewise, at least one qubit 520b, 520h of the second subset is a mirror image of, or has reflection symmetry with, the qubit 520a, 520g, respectively, that the qubit 520b, 520h crosses.

The longitudinal or major axes 515 of the qubits 510 of the first subset of qubits are nonparallel (e.g., perpendicular) to the longitudinal or major axes 516 of the qubits 520 of the second subset of qubits. The qubits 510 of the first subset may, for instance, be laid out generally horizontally in the plane of the drawing sheet of FIG. 5, and hence are denominated herein as horizontal qubits 510 for ease of discussion. The qubits 520 of the second subset may, for instance, be laid out generally vertically in the plane of the drawing sheet of FIG. 5, and hence are denominated as vertical qubits 520 for ease of discussion. While the qubits of the first subset are illustrated as being perpendicular with respect to the qubits of the second set, such is not intended to be limiting. Other implementations may include other orientations between the qubits of one subset with respect to the other subset of qubits.

Another way to describe the geometrical relationship between qubits of a subset is that the qubits 510 of the first subset each have loops that principally or predominately extend along or have an axis of symmetry about a first axis 515b of a die, wafer or substrate which carries the qubits 510, the qubits 520 of the second subset each have loops that principally or predominately extend along or have an axis of symmetry about a second axis 516b of a die, wafer or substrate which carries the qubits 520, the second axis 516b is non-parallel with the first axis 515b. The first axis 515b and/or the second axis 516b may or may not correspond to a geometric feature or characteristic of the die, wafer or substrate. For example, where the die, wafer or substrate has a rectangular profile or shape, the first axis 515b and the second axis 516b may be parallel to the edges of the die, wafer or substrate. Alternatively, the first axis 515b and the second axis 516b may be arbitrary but fixed axes defined on the die, wafer or substrate.

The set 500 includes at least one qubit from one subset of essentially parallel qubits that crosses at least one qubit from the other subset of essentially parallel qubits.

As previously described, set 500 represents a single set in a quantum processor, whereas the corresponding quantum processor architecture may comprise a plurality of sets 500 tiled over an area. A complete processor architecture may employ a plurality of sets 500 where each individual set 500 is positioned adjacent (i.e., neighboring) at least one other set 500. Notably, on a single processor device or wafer, none of the loops of the qubits that comprise one set cross any of the loops of the qubits that comprise any other set. A person of skill in the art will appreciate that while sixteen qubits are illustrated in set 500, this number is arbitrary and set 500 may comprise more or fewer than sixteen qubits (but must comprise at least four qubits).

Qubits 510, 520 may be superconducting qubits. Each qubit 510a-510h may be a respective loop of superconducting material where at least a first portion of each loop of superconducting material is elongated along a respective major or longitudinal axis that extends along the horizontal axis in the plane of the drawing sheet of FIG. 5. Each qubit 510a-510h is interrupted by at least one respective Josephson junction 540a-540d (only Josephson junctions 540a-540d of respective qubits 510a-510d are called out in FIG. 5 to reduce clutter). Each qubit 510a-510h may be a respective loop of superconducting material where at least a first portion of each loop of superconducting material is elongated along a respective major or longitudinal axis that extends along the vertical axis in the plane of the drawing sheet of FIG. 5, and interrupted by at least one respective Josephson junction 542a-542d (only Josephson junctions 542a-542d of respective qubits 520a-520d are called out in FIG. 5 to reduce clutter). At least the first portion or a majority of each of horizontal qubits 510 are laid out substantially parallel to one another (i.e., respective major or longitudinal axes parallel to one another, and illustrated as parallel to the horizontal axis). At least the first portion or a majority of each of vertical qubits 520 are laid out substantially parallel to one another (i.e., respective major or longitudinal axes parallel to one another, and illustrated as parallel to the vertical axis of the drawing sheet of FIG. 5). The major or longitudinal axes of the horizontal qubits 510 are substantially perpendicular to the major or longitudinal axes of the vertical qubits 520. Each of horizontal qubits 510 are in a first subset of qubits and each of vertical qubits 520 are in a second subset of qubits.

Some problems may be solved by embedding the problem into a quantum processor that is well designed for embedding the particular problem. For instance, it may be advantageous to employ a fixed quantum processor architecture that is different or modified from the fixed quantum processor architecture described in, for example U.S. Pat. No. 8,421,053. Such different or modified architecture may, for instance, allow better embedding and/or solution of certain problems. With respect to the fixed quantum processor architecture described in, for example U.S. Pat. No. 8,421, 053, communicatively coupling a pair of qubits in the same subset of qubits of a set as well as enabling communicative coupling between pairs of qubits in adjacent sets (for example, diagonally adjacent sets) may produce different or modified quantum processor architectures with different qubit interaction patterns between qubits in adjacent sets.

For example, in set 500 illustrated in FIG. 5, a portion of qubits 520a and 520b are each arranged at an angular deviation to at least the first portion (e.g., elongated or major portions) of respective qubits 520a and 520b such that qubit 520a may cross qubit 520b. In particular, for qubits 520a and 520b, an intermediate portion extends diagonally between a first elongated or major portion and a second elongated or major portion, forming a general Z-shape, with the first and the second elongated or major portions forming the upper and lower portions of the Z, and the diagonally extending portion therebetween. (As noted below, qubits 520g and 520h have a similar structure and configuration to that of qubits 520a and 520b.) A coupling device such as coupling device 530c placed proximate the portion of qubit 520a that crosses a portion of qubit 520b may couple qubits 520a and 520b together. Similarly, qubits 510a and 510b may be communicatively coupled by coupling device 530b as a result of qubit 510a crossing qubit 510b where a second portion of qubits 510a and 510b are arranged at an angular deviation to at least the first portion (e.g., elongated or major portions) of respective qubits 510a and 510b that are laid out generally horizontally in the plane of the drawing sheet of FIG. 5. Qubits 510a and 510b are in the same subset of qubits (i.e., first subset of qubits) as a first portion of each qubit 510a and 510b laid out generally horizontally in the plane of the drawing sheet of FIG. 5. Similarly, qubits 520a and 520b are in the same subset of qubits (i.e., second subset of qubits) as a first portion of each qubit 520a and 520b laid out generally vertically.

Coupling device 530a may communicatively couple qubit 520a and 510a together where qubit 520a crosses qubit 510a. Qubit 510a may be in a first subset of qubits and qubit 520a may be in a second subset of qubits. Coupling device 530a may be in a first subset of intra-cell coupling devices as coupling device 530a couples a pair of qubits in different sets of qubits (i.e., first and second subset of qubits) in the same set (i.e., set 500). Similarly, coupling devices 530b, 530c that may couple pairs of qubits in the same subset of qubits (i.e., either the first subset or the second set) in the same set may be in a second subset of intra-cell coupling devices. Only coupling device 530a of the first subset of intra-cell coupling devices and coupling devices 530b and 530c of the second subset of intra-cell coupling devices are called out in FIG. 5 to reduce clutter. The second subset of intra-cell coupling devices may increase the strength of coupling between qubits in the same set.

As illustrated in FIG. 5, qubits 520c-520f are elongated along a respective major or longitudinal axis (e.g., substantially parallel to the vertical axis in the plane of the drawing sheet) with no angular deviation between portions except at the ends of the qubit loop, whereas a portion of each of qubits 520a, 520b, 520g and 520h are arranged at an angular deviation to the respective major or longitudinal axis of the qubits 520a, 520b, 520g and 520h, respectively.

While the ends of the qubits 520c-520f are illustrated as formed by straight segments, other shapes may be employed, for instance arcuate shapes. Similarly, qubits 510c-510f are elongated along a respective major or longitudinal axis (e.g., substantially parallel to the horizontal axis in the plane of the drawing sheet) with no angular deviation between portions except at the ends of the qubit loop, whereas a portion of each of qubits 510a, 510b, 510g and 510h are arranged at an angular deviation to the respective major or longitudinal axis of the qubits 510a, 510b, 510g and 510h, respectively. A person of skill in the art will appreciate that in alternate embodiments, qubits 520c, 520f, 510c and 510f may be arranged at an angular deviation similar to qubits 520a, 520b, 520g, 520h, 510a, 510b, 510g and 510h such that qubits 520c and 520f may be communicatively coupled to a respective qubit in the same subset of qubits (i.e., second subset of qubits) and qubits 510c and 510f may be communicatively coupled to a respective qubit in the same subset of qubits (i.e., first subset of qubits). Furthermore, in alternative embodiments, the angular deviation of certain qubits in set 500 such as qubits 510a and 510b may be arranged anywhere within or outside set 500.

Examples of superconducting qubits include superconducting flux qubits, superconducting charge qubits, and the like. See e.g., Makhlin et al., 2001, *Reviews of Modern Physics* 73, pp. 357-400. Examples of flux qubits that may be used include rf-SQUIDs, which include a superconducting loop interrupted by one Josephson junction, persistent current qubits, which include a superconducting loop interrupted by three Josephson junctions, and the like. See e.g., Mooij et al., 1999, *Science* 285, 1036; and Orlando et al., 1999, *Phys. Rev. B* 60, 15398. Other examples of superconducting qubits can be found, for example, in Il'ichev et al., 2003, *Phys. Rev. Lett.* 91, 097906; Blatter et al., 2001, *Phys. Rev. B* 63, 174511, and Friedman et al., 2000, *Nature* 406, 43. In addition, hybrid charge-phase qubits may also be used.

As previously described, coupling devices such as coupling devices 530a-530d (collectively 530) may provide pair-wise communicative coupling between respective pairs of qubits 510 and/or 520. Specifically, coupling device 530a provides communicative coupling between a horizontal qubit 510a and a vertical qubit 520a at a region proximate where the horizontal qubit 510a and the vertical qubit 520a cross one another, coupling device 530b provides communicative coupling between a pair of horizontal qubits 510a and 510b at a region proximate where the horizontal qubits 510a and 510b cross one another, and coupling device 530c provides communicative coupling between a pair of vertical qubits 520a and 520b at a region proximate where the vertical qubits 520a and 520b cross one another. Each coupling device 530 may be a respective loop of superconducting material interrupted by at least one respective Josephson junction. Coupling devices 530 may be tunable as described in, for example U.S. Pat. Nos. 7,619,437, 7,969, 805 and 7,898,282, etc. in that the coupling created between two respective qubits by coupling devices 530 may be changed during the operation of a quantum processor.

Set 500 may be laid out into an integrated circuit. The integrated circuit may be multi-layered. There may be at least two layers of metal in the integrated circuit. At least a portion of each qubit 510 may be laid out in a first metal layer of the integrated circuit. At least a portion of each qubit 520 may be laid out in a second metal layer of the integrated circuit. For example, horizontal qubit 510a and vertical qubit 520a may both be laid out in the first metal layer and a portion of qubit 520a may briefly change layers (i.e., switch to the second metal layer) to tunnel under or bridge over qubit 510a at an approximate position where qubit 520a crosses qubit 510a. Alternatively, a portion of qubit 510a may briefly change layers (i.e., switch to the second metal layer) to tunnel under or bridge over qubit 520a at an approximate position where qubit 520a crosses qubit 510a.

At least a portion of each coupling device may be laid out in the first metal layer and/or the second metal layer and/or a third metal layer. The third metal layer may be interposed between the first metal layer and the second metal layer. For example, coupling devices 530 may exist in the first, second or third metal layer or in the first and second, second and third or first and third metal layers or the first, second and third metal layers. Vias may be used within qubits 510, 520 and/or coupling devices 530 to electrically connect any or all of the first, second and third metal layers together. Further details of vias that electrically couple multiple metal layers in a superconducting integrated circuit are described in, for example, U.S. Patent Publication 2011-0089405.

On-chip control circuitry may be laid out efficiently within areas within the set defined by the qubits 510 and 520. Examples of on-chip control circuitry can be found in U.S. Pat. Nos. 7,876,248, 8,098,179, 7,843,209, 8,018,244, 8,169,231 and U.S. Patent Publication 2012-0094838.

The set 500 of qubits also includes a readout subsystem 542 that includes 16 readout devices configured to read out the state of all the qubits 510 and 520. In the embodiment shown in FIG. 5, each of the readout devices in the readout subsystem 542 may include a respective DC-SQUID that is configured to inductively couple to the corresponding qubit. The readout subsystem 542 may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in U.S. Patent Publication No. 2013/0278283, incorporated herein by reference. In the implementation illustrated in FIG. 5, the readout subsystem 542 is positioned and operable to readout the states of all the qubits 510 and 520.

A feature of adiabatic quantum computation and quantum annealing is that the qubit states typically only need to be read out at the end of the annealing schedule when the quantum evolution has finished. This means that the qubit states that are read out are actually classical states. Systems and methods for qubit readout in processors designed to perform adiabatic quantum computation and/or quantum annealing are typically only used to read out the classical 0 and 1 states of the qubits at the end of a quantum evolution. This is in contrast to readout systems and methods in processors designed to perform gate-model and/or circuit-model quantum computation, where it can be necessary for the readout system to probe states of the qubits during the computation process without destroying those states.

The classical 0 and 1 states of a superconducting flux qubit are typically associated with clockwise and counter-clockwise circulating currents (respectively, though the assignment of direction is arbitrary; i.e., the 0 state may be associated with clockwise circulating current while the 1 state is associated with counter-clockwise circulating current, or the 0 state may be associated with counter-clockwise circulating current while the 1 state is associated with clockwise circulating current) in the qubit loop. The circulating current in the qubit loop is typically measured indirectly by inferring its direction from the direction of the resulting magnetic field (or magnetic flux) produced.

Physical implementations of the readout system 442 can be problematic because a readout event can involve the dissipation of significant energy. A DC-SQUID indicates the state of a qubit by switching into a voltage state, which necessarily generates heat and consequently increases the temperature of the qubit.

The performance characteristics of superconducting qubits are known to be heavily influenced by the temperature at which the superconducting qubits are operated. In general, it is advantageous to operate superconducting qubits at as cold a temperature as possible, typically on the order of approximately 20-40 mK. Since the readout system 442 relies on DC-SQUID switching into its voltage state, the operation of the readout system undesirably heats the qubits and has an adverse effect on the performance characteristics of qubits. Thus, after the readout system 442 is operated, it may be necessary to wait for the qubits to re-cool (i.e., "thermalize") and return to their base temperature before performing further computations or evolutions with the qubit.

As previously described, in applications of adiabatic quantum computation and quantum annealing, it is typically only desired to determine the classical state of the qubits at the end of a quantum evolution. For a single computation, there are no further evolutions of the qubits required after readout, but the heating effects of readout system 442 can still be problematic. This is because it is often advantageous to run multiple readout operations even after a single iteration of computation in order to determine a distribution of readout probabilities. In this case, successive readout operations must be separated by a thermalization period to allow the system to return to colder temperatures. Furthermore, adiabatic quantum computation and quantum annealing are inherently heuristic approaches to performing computation and, therefore, can generally benefit from being run in multiple iterations. For example, in order to employ adiabatic quantum computation or quantum annealing to solve a problem, it may be preferable to run multiple iterations of the adiabatic quantum computation or quantum annealing algorithm and to select the "best" output as the solution to the problem. That is, a computational problem may preferably be solved by initializing the qubits of a quantum processor in a first configuration, evolving the qubits of the quantum processor to a second configuration, reading out the states of the qubits, and then repeating for a second iteration by re-initializing the qubits in a first configuration, re-evolving the qubits to a second configuration, re-reading out the states of the qubits, and then repeating again for additional iterations, etc. until a solution is output that satisfies some solution or timing criteria.

For the iterative approach to adiabatic quantum computation and quantum annealing described above, the heating effect of a DC-SQUID in the readout system 442 can introduce significant thermalization delays as it is necessary to wait for the qubits to re-cool after the readout of a first iteration before proceeding with a second iteration. Depending on the cooling power of the refrigeration system being used and on the quality of thermal connections to the qubits, the resulting thermalization delays can considerably increase the time it takes to produce a satisfactory solution to the computational problem.

Previously, computational systems employing quantum processors were restricted by the need to read out the state of every qubit. As discussed above, the amount of time required to read the states of all qubits can be large. Further, reading all of the qubits can introduce errors into the quantum processor. For example, a deviation from the base temperature resulting from reading out the states of qubits may introduce error. Infrastructure forming at least a part of readout system 442 may also introduce error. Additionally, in some instances, the hardware distribution over all the qubits of a quantum processor may achieve fewer minima and less uniform distribution over states (i.e., quantum bias over optima), compared to the implementations discussed herein. As described further below, in the presently described implementations, composite distributions are obtained by combining samples returned from a subset of the qubits of a quantum processor with classical post-processing operations. The joint or composite procedures of the present implementations may be executed in such a way that the time required for partial readout and post-processing is less (i.e., faster) than a full readout of the qubits. Further, for some sets of qubits, the joint procedures may be executed in such a way that the quality of samples returned is improved over a full readout, with respect to optimization and uniform sampling applications. Alternatively, a full readout may be executed followed by post-processing operations to achieve benefits offered by a composite distribution. As used herein, a "partial readout" or a readout of a "subset" of qubits may include readout of a set of qubits that is equal to or smaller in size than the set of qubits in a quantum processor (e.g., all of the qubits, half of the qubits, a quarter of the qubits, etc.).

Figure 7:
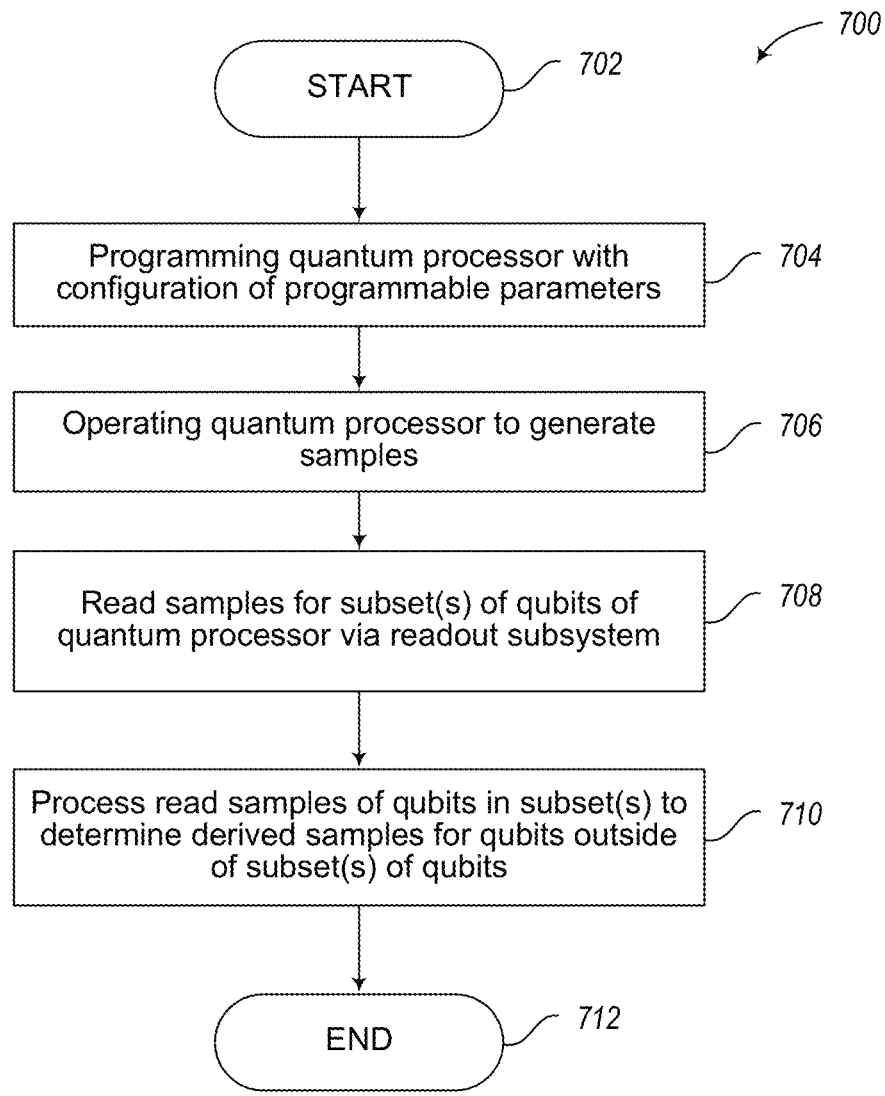
FIG. 7 is a flow diagram showing a method of reading a subset of qubits in a quantum processor in accordance with the presently described systems, devices, articles and methods.

FIG. 7 shows a method 700 of operation in a computational system that generates composite distributions, according to the presently described systems, devices, articles and methods.

The method 700 starts at 702, for example in response to submission of a problem or in response to an invocation by another routine. The method 700, or portions thereof, may be executed by one or more processor-based components, for example via one or more processor-based devices, which is communicatively coupled to one or more heuristic optimizers or solvers implemented via appropriate hardware circuitry (e.g., quantum processors, non-quantum processors).

At 704, the at least one processor-based device programs, configures and/or instructs a quantum processor to solve a problem, for instance at least approximately minimizing an objective function.

The shape of a probability distribution demonstrated by results returned from a quantum processor may be characteristic of (i.e., dependent upon and/or particular to) the problem formulation and/or configuration of programmable parameters being employed. In other words, the shape of the probability distribution may change depending on how the quantum processor is programmed. Adiabatic quantum computation and quantum annealing both attempt to resolve a minimum energy configuration for the elements of a quantum processor, subject to a specific problem formulation and/or configuration of programmable parameters. In either algorithm, the processor intrinsically tends to return a bit string corresponding to a relatively low energy configuration of the processor with higher probability compared to the probability of returning a bit string corresponding to a relatively high energy configuration of the quantum processor. Environmental influences such as noise and thermal energy can excite the processor during computation (i.e., during evolution) and result in a bit string being returned that is not the lowest energy configuration of the processor, but in general, the bit string returned will tend to correspond to at least a "low-energy" state (if not the lowest energy state) of the quantum processor with high probability. Environmental factors may excite the quantum processor out of its lowest energy configuration, however the underlying nature of the adiabatic quantum computation and quantum annealing algorithms described herein tends to stabilize in a low (e.g., the lowest) energy configuration accounting for the influences of the environmental factors. These environmental factors can be random and their effects can be difficult to predict. Accordingly, as taught in US Patent Publication 2012-0023053, in many applications it is advantageous to run an adiabatic quantum computation and/or quantum annealing algorithm multiple times and to extract the "best" solution from the solution set generated.

The applications of adiabatic quantum computation and/or quantum annealing in the presence of environmental factors such as noise and thermal energy described in the present systems and methods may be treated as sampling processes, where the quantum processor is operated as a sample generator that intrinsically tends to provide samples from low-energy states with high probability. In other words, the probability distributions of the quantum processors described herein are such that the processors intrinsically tend to return low-energy states with high probability and high-energy states with low probability. In accordance with the present systems and methods, a sample generator that intrinsically provides samples from low-energy states with high probability may be particularly useful in solving combinatorial optimization problems, such as minimization problems.

While the quantum processors described herein intrinsically return low-energy states with high probability, the actual shape of the probability distribution corresponding to a quantum processor depends on how the quantum processor is programmed. In accordance with the present systems and methods, the shape of the probability distribution corresponding to a quantum processor may be deliberately adjusted or tuned so that high probability bit strings correspond to desired solutions to a computational problem. Throughout this specification and the appended claims, reference is often made to the "shape" of a probability distribution. Unless the context requires otherwise, the "shape" of a probability distribution refers to the relative probabilities corresponding to the bit strings that may be output by the sample generator (e.g., quantum processor). The shape of a probability distribution may, for example and in some instances, be regarded as a "topology" of the probability distribution. In some embodiments, the shape of the probability distribution of a quantum processor may at least approximate a Boltzmann distribution.

At 706, the processor-based device may operate the quantum processor as a sample generator to provide samples from a probability distribution. As an example, assume the quantum processor has a joint probability distribution P(x) described by a Boltzmann distribution. The problem Hamiltonian is H, and the goal may be to sample from the following distribution:

$$P(x) \propto \exp(-\beta H(x))$$

This is a special case and corresponds to sampling uniformly. In some situations, the goal may be to sample from a non-uniform distribution.

At 708, the processor-based device may read samples via a readout system (e.g., readout system 442 of FIG. 4) for a subset of qubits of the quantum processor. As discussed below, in some implementations, the processor-based device may cause a readout subsystem to perform a full readout of all the qubits of a quantum processor and then discard a portion (e.g., half, a quarter) of the samples in a post-processing operation.

At 710, the processor-based device may generate derived or reconstructed samples for qubits outside the subset of qubits that were read by the readout system. In implementations where the processor-based device causes a readout of all the qubits in the quantum processor, the processor-based device may cause execution of a post-processing operation that ignores or discards a subset of the samples and subsequently reconstructs the discarded samples (e.g., using one or more of the solvers 322 of FIG. 3).

For example, assume a partition of the random variables x into $x_1$ and $x_2$, such that fast exact sampling from $P(x_2|x_1)$ is possible. In this example, the qubits or states $\hat{x}_1$ read by the readout system correspond to $x_1$, while the qubits or states $\hat{x}_2$ that were not read or were discarded correspond to $x_2$. After obtaining the read samples $\hat{x}_1$, the processor-based device may sample $x_2$ conditioned on i.e., from $P(x_2|x_1=\{\hat{x}_1\})$. This value is referred to as $\hat{x}_2$. The processor-based device may then return the composite sample $\hat{x}=\hat{x}_1 \cup \hat{x}_2$.

A procedure to sample from $P(x_2|x_1)$ is particularly simple in the case that $H(x)$ is bipartite, and $\{x_1,x_2\}$ have cardinality $N_1$ and $N_2$, respectively. Assuming $x_1$ and $x_2$ are classical spin vectors where each component takes the value from $\{-1, 1\}$, the problem Hamiltonian may be written without loss of generality as:

$$H(x_1,x_2)=x_1^T J x_2 + h_1^T x_1 + h_2^T x_2$$

labeling the components $x_2=\{x_{2,1}, x_{2,2}, \ldots, x_{2,N2}\}$.

Thus, the conditional probability distribution may be written as:

$$P(x_2|x_1 = \hat{x}_1) \propto \prod_{i=1}^{N_2} \exp(-\beta(\hat{x}_1^T J_{\cdot,i} + h_{2,i})x_{2,i})$$

To sample $\hat{x}_2$, the processor-based device may implement the following:

$$\hat{x}_{2,i}=\text{sign}(r_i - \tanh[\beta(\hat{x}_1^T J_{\cdot,i} + h_{2,i})])$$

where $r_i$ is a random number on the interval $[-1, 1]$. The random number $r_i$ may be a pseudo random number or truly random number generated by a quantum random number generator. It is noted that, assuming the quantum annealer architecture of the quantum processor has sparse connectivity, the inner product $\hat{x}_1^T J_{\cdot,i}$ requires O(1) operations per assignment.

The computation shown in Equation 4 above may be implemented in parallel or sequentially by one or more processor-based devices (e.g., FPGA).

The method 700 may end at 712 until started or invoked again. For example, the method 700 may start again when the processor-based device receives instructions to solve a problem or generate samples using a quantum processor.

As discussed above, in some implementations, objective or cost functions that can be minimized using implementations of quantum processors discussed herein have certain conditional independencies. The most notable relate to the quasi two-dimensional structure (owing to local connectivity on a flat surface). A second feature is the aforementioned bipartite nature of the connectivity (e.g., vertical qubits and horizontal qubits are coupled, but have no internal coupling).

Although a quantum processor architecture implementing a bipartite graph of connectivity may be a more natural fit, the present systems and devices may still be applied to other quantum processor architectures (e.g., one that implements a non-bipartite graph). However, the number of read states that must be observed (i.e., not discarded) may increase for non-bipartite graphs compared to bipartite graphs, assuming residual problems to be solved in both instances have the same level of difficulty as determined by the treewidth. If one is willing to solve a more difficult residual problem of greater treewidth, the number of states that must be observed may decrease (i.e., more information may be discarded in exchange for solving a more difficult problem). Hence, non-bipartite graphs may still benefit from the presently described systems and devices, but the number of read states required and the problem difficulty need to be appropriately balanced. A consequence of the bipartite structure is that knowing the states of the vertical qubits (or another subset of qubits) for some optima allows the horizontal qubit values to be reconstructed without use of a quantum processor. Reconstruction using classical post-processing (e.g., FPGA) may be significantly faster than reading out the qubits from a quantum processor. In some implementations, the quantum processor may be designed to avoid the wasteful operation of measuring all of the qubits (e.g., the horizontal qubits), measuring and/or returning only a subset of the qubits, or returning a composite of the qubits that includes qubits that are read out of the quantum computer and qubits that are reconstructed based at least in part on read qubits.

As discussed above, in some implementations, a quantum processor may be configured such that there is no infrastructure to measure certain qubits. This freedom allows new design possibilities for quantum processor architectures. For example, only reading out a fraction of the qubits of a quantum processor may allow a reduction in hardware infrastructure, a reduction in initial calibration costs, a reduction in error sources, as well as a reduction of the time required to read out from the hardware. For example, stacking three layers in an integrated circuit and not reading the middle layer does not present a problem using the presently disclosed implementations as missing values of the middle layer may be reconstructed by read values.

Assuming an infrastructure is maintained for measuring all of the qubits in a quantum processor, this infrastructure may be adapted to allow measurement of only a subset of qubits. The subset of qubits that are measured may be fixed, programmable, or random. There may be multiple subsets of qubits that are measured.

In these implementations, the missing states may be completed by fast exact sampling using a fast processor (e.g., FPGA) which works online alongside the quantum processor. This fast processor-based device may implement a simple and rigorous post-processing operation by default, for example. Alternatively, for some implementations, it is only necessary to return the subset of measured qubits (e.g., if the unmeasured qubits are latent variables of the particular model).

Even without modifying a readout procedure for reading qubits of a quantum processor, the post-processing operation may be implemented as a fast online intermediate method, and presented to users as an option for sampling.

Should the quantum processor fail in returning acceptable optima, new optima can be found by post-processing operations utilizing the presently described implementations. In fact, if the quantum processor does not find solutions perfectly, the post-processing operation can find strictly more optima by ignoring half the results (in the bipartite case) and using the above conditional procedure—even if optima are not found, some high-energy solutions are transformed into lower energy solutions.

Suppose for example the quantum processor is operative to read all qubits (e.g., $x_1$ and $x_2$), but is faulty and makes an error reading qubits corresponding to the random variable $x_2$. If the direct results from the quantum computer are used, then a suboptimal sample would be obtained. However, by using only $\hat{x}_1$ and the aforementioned post-processing procedure, any error on $x_2$ is perfectly corrected, and an optima is obtained. If instead the quantum processor is faulty and returns $\hat{x}_1$ not consistent with any optima, then the quantum processor result with or without post-processing will be incorrect. Still, the result from the post-processed sample is guaranteed not to have larger energy than the unprocessed sample.

Consider the case where the quantum processor returns $\hat{x}_1$, $\hat{x}_2$ (i.e., all qubits). In this case, if either $\hat{x}_1$ or $\hat{x}_2$ is wrong then the output of the direct quantum model is not optimal. By contrast, using the above post-processing operation (e.g., ignore $\hat{x}_2$), errors in $\hat{x}_2$ are irrelevant.

Although information is lost when only a portion of the total read information is considered, in the bipartite case, if there are errors on $x_1$ but not on $x_2$, the post-processing operation could be done in the opposite order to obtain optima in three scenarios: (1) no error on $x_1$, no error on $x_2$; (2) no error on $x_1$, errors on $x_2$; and (3) errors on $x_1$, no error on $x_2$. In some instances, it may be possible to reach the same minima just by iterating the classical sampling procedure. The conditional entropy of $x_2$ given $x_1$ (i.e., the amount of information thrown away) should be small for many problems of interest. In the scenario where $x_2$ is close to a minima but $x_1$ contains errors, it is likely that the distribution of errors on $x_1$ is a very simple one consisting of a handful of isolated excitations. If instead of applying a gradient descent act only once, it is applied recursively, the errors on $x_1$ are likely to be corrected such that optima may be found. The errors may be correlated. In some scenarios, there may be less value in considering both sets.

As discussed above, fast post-processing strategies that improve, strictly or probabilistically, the results obtained from quantum computers are disclosed. Many of these strategies make use of the bipartite structure as an intermediate stage, and the initial step of ignoring qubits corresponding to $x_2$ and replacing them by some inferred value is not pathological to the function of the systems and methods disclosed herein.

An example of a fast iteration scheme is now described. Beginning with the samples returned from the quantum processor, iterate the process: $x_{t=0 1}=\hat{x}_1$; $x_{t2}=\text{sign}(x_{t1}J_{12}+h_2)$; $x_{t+1 2}=\text{sign}(J_{12}x_{t2}+h_1)$, where for components of argument zero either leave the value unchanged or choose a new value arbitrarily. Acting on any solution, these acts never increase the energy, and they can allow a solution to relax to its nearest local minima (or some minima within a cluster, depending how a tie-breaking rule is implemented). This iteration is terminated when the energy is no longer decreased for a number of steps, or the values of x stop evolving. Thus, by taking only half the qubits, local gradient descent or other exact sampling procedure can be done on the remaining qubits at a cost O(1) on every qubit. Any minima that can be found under the quantum processor will be found under the composite procedure, and possibly some additional minima.

If the quantum processor of the computational system works fairly, then a composite sampler is equivalent. The quantum processor, if it is functioning as a quantum annealer, will not uniformly sample the ground states unless the ground states have some special symmetry. Quantum annealing as implemented by the quantum processor favors solutions that are within large clusters or are highly connected (i.e., in solutions space, have many neighboring solutions at Hamming distance 1) over solutions that are weakly connected (i.e., in solution space, e.g., have no neighboring solutions at Hamming distance 1). However, provided the quantum distribution and uniform distribution are close (e.g., KL divergence), sampling from one allows sampling from the other. For example, if one is interested in sampling from a distribution with an understood quantum bias, one could sample from the uniform distribution and reconstruct a sample from the quantum distribution, or vice-versa. This assumes both distributions are known. In situations where the quantum distribution is understood, importance sampling can be used, and weights provided.

As can be appreciated, one disadvantage of the half-readout process may be that it becomes more difficult to understand the quantum bias in the quantum processor distribution. However, to use the distribution effectively, it is only necessary to know the half-quantum half-classical distribution.

Suppose the quantum processor or sampler is a fair sampler with some errors (e.g., sampling with clamping). Then, this method can be used to sample directly from the hardware obtaining $\hat{x}=(\hat{x}_1,\hat{x}_2)$. Next, suppose that half the information ($\hat{x}_2$) is thrown away. The desired sampler takes solutions uniformly from a Boltzmann distribution, such as:

$$P(x_1,x_2)=(1/Z(\beta))\exp(-\beta H(x_1,x_2))$$

A uniform distribution over optima may be of interest, which is to sample in the limit $\beta \to \infty$ (the limit is well defined). This target distribution can be decomposed into a product of conditional and marginal distributions:

$$P(x_1)P(x_2|x_1) = P(x_1)\prod_{x \in x_2} P(x|x_1)$$

The above decomposition uses the fact that due to the bipartite structure, the variables $x_2$ are conditionally independent given $x_1$.

Sampling perfectly from the marginal conditional probabilities given the set of variables $x_1$ is again fast (i.e., $O(1)$) and parallelizable given one random number per element in $x_2$. Thus, for a fair set of samples $x_1$, a fair set of samples $(x_1, x_2)$ can easily be generated, and half of the information ($\hat{x}_2$) may be discarded.

Further, if the quantum processor or sampler is unfair, the composite samplers disclosed herein are fairer than the quantum processor. For example, consider the case where the quality of the quantum processor sample is not perfect, e.g., sampling too often a particular value $\hat{x}_1$ (i.e., $P_{HW}(x_1)$ is not equal to the target distribution $P_{target}(x_1)$).

If a goal is to sample optima uniformly, discarding $\hat{x}_2$ returned by the quantum processor does not make the distribution more biased, even if the distribution on the quantum processor is biased.

Another example of a fast iteration scheme is Gibbs sampling (e.g. blocked Gibbs sampling). Using the independence of $x_2$ given $x_1$ and the independence of every element $x_1$ given $x_2$, the processor-based device may execute a Markov chain alternating sampling between the two halves. This operation is guaranteed to converge to the target distribution over sufficient time (at finite β) or, as discussed above, will at least lead to a more uniform distribution. Thus, when reading only half the qubits, a simple parallel post-processing operation of cost $O(1)$ on every qubit allows samples that are at least as fair (close to uniform samples) as can be obtained from the quantum processor alone.

The use of the aforementioned bipartite structure is a specific case of a more general principle: given $x_1$ consistent with some optima, or $x_1$ sampled from $P(x_1)$, there is a residual problem to optimize or sample from $P(x_2|x_1)$. If the set $x_1$ are carefully chosen, the treewidth of the remaining graph will be small. A set chosen such that the width of the remaining graph has treewidth 0 would require less processing. Higher treewidth choices would require more processing, but such operations may be implemented outside the hardware, or may be implemented online with the hardware sweeps.

In some implementations, the processor-based device may read all of the qubits (e.g., $x_1$ and $x_2$) of a quantum processor simultaneously and then derive two solutions from the single hardware readout. For example, the processor-based device may derive $x_2$ using the readout of $x_1$, and may derive $x_1$ using the readout of $x_2$.

Further, in instances where a readout is expensive relative to a post-processing on a digital computer (e.g. FPGA), smaller fractions of qubits of a quantum processor may be readout. For example, in some implementations, only every other column of a subset of vertical qubits (i.e., ¼ of the qubits) may be read. Then, the remaining qubits may be reconstructed, a problem which has treewidth 4. Similarly, only ⅙ of the qubits of a quantum processor may be read in implementations where it is suitable to execute a post-processing operation on a problem of treewidth 8.

In some implementations of the above described methods, processes or techniques, detected samples can be clustered or weighted before sampling. In some implementations, the methods, processes or techniques generate one set of derived samples (or weighted samples) for each set of detected samples. In other implementations, more than one set of derived samples can be generated from the same set of detected samples.

Some sampling techniques provide weights. In some cases, the derived samples can inherit weights associated with the detected samples. One situation in which weights might be used is if the performance of the sampler is time-dependent.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the commonly assigned US patent application publications, US patent applications, foreign patents, and foreign patent applications referred to in this specification and/or listed in the Application Data Sheet, including but not limited to commonly assigned:

U.S. Pat. No. 7,303,276;

U.S. patent application Ser. No. 14/173,101, filed Feb. 5, 2014, now patent application publication no., 2014-0223224;

International patent application Serial No. PCT/US2014/014836, filed Feb. 5, 2014, now WIPO publication number WO2014123980;

U.S. patent application Ser. No. 14/339,289, filed Jul. 23, 2014, now US Patent Application Publication 2015-0032993;

U.S. patent application Ser. No. 14/340,303, filed Jul. 24, 2014, now patent application publication no., 2015-0032994;

U.S. provisional patent application Ser. No. 61/858,011, filed Jul. 24, 2013;

U.S. provisional patent application Ser. No. 62/040,643, filed Aug. 22, 2014, titled: SYSTEMS AND METHODS FOR PROBLEM SOLVING VIA SOLVERS EMPLOYING PROBLEM MODIFICATION;

U.S. provisional patent application Ser. No. 62/040,646, filed Aug. 22, 2014, titled: SYSTEMS AND METHODS FOR PROBLEM SOLVING VIA SOLVERS EMPLOYING POST-PROCESSING THAT OVERLAPS WITH PROCESSING;

U.S. provisional patent application Ser. No. 62/040,661, filed Aug. 22, 2014, titled: SYSTEMS AND METHODS FOR PROBLEM SOLVING VIA SOLVERS EMPLOYING SELECTION OF HEURISTIC OPTIMIZER(S); and U.S. provisional patent application Ser. No. 62/040,890, filed Aug. 22, 2014, titled: Systems and methods for improving the performance of a quantum processor by correcting to reduce intrinsic/control errors; and U.S. provisional patent application Ser. No. 62/048,043, filed Sep. 9, 2014, titled: Systems and Methods for Improving the Performance of a Quantum Processor via Reduced Readouts, each of which is incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computational system comprising:
at least one quantum processor comprising:
a plurality of qubits including a first set of qubits and a second set of qubits;
a plurality of coupling devices, wherein each coupling device provides controllable communicative coupling between two of the plurality of qubits; wherein at least one qubit in the second set of qubits is not communicatively coupled to any qubit in the first set of qubits
a first readout subsystem responsive to a state of each of the qubits in the first set of qubits to generate a first set of detected samples, each detected sample in the first set of detected samples represents a respective one of the qubits in the first set of qubits;
at least one post-processing processor-based device communicatively coupled to the at least one quantum processor; and
at least one non-transitory computer-readable storage medium communicatively coupled to the at least one post-processing processor-based device and that stores at least one of processor-executable instructions or data, where in use the at least one post-processing processor-based device:
receives the first set of detected samples that represents the qubits in the first set of qubits; and
post-processes the first set of detected samples to generate a first set of derived samples, wherein each sample in the first set of derived samples represents a respective one of the qubits in the second set of qubits.

2. The computational system of claim 1 wherein each coupling device is positioned proximate a respective point where a respective one of the qubits in the first set of qubits is proximate one of the qubits in the second set of qubits and provides controllable communicative coupling between the qubit in the first set of qubits and the respective qubit in the second set of qubits.

3. The computational system of claim 1 wherein the at least one post-processing processor-based device comprises at least one of a microprocessor, a digital signal processor (DSP), a graphical processing unit (GPU), or a field programmable gate array (FPGA).

4. The computational system of claim 1 wherein the at least one post-processing processor-based device:
generates the derived samples that represent the second set of qubits by execution of an exact sampling procedure; and
continues execution of the exact sampling procedure until one or more termination criteria occur.

5. The computational system of claim 1 wherein the at least one post-processing processor-based device:
generates the derived samples that represent the second set of qubits by execution of a procedure selected from the list of a local gradient descent procedure on the detected samples and a Gibbs sampling procedure.

6. The computational system of claim 1 wherein the at least one post-processing processor-based device:
generates at least two of the derived samples that represent the second set of qubits concurrently.

7. The computational system of claim 1 wherein, in use, the at least one quantum processor performs quantum annealing or adiabatic quantum computing.

8. The computational system of claim 1 wherein the qubits in the first set of qubits and the qubits in the second set of qubits are randomly selected by the computational system.

9. The computational system of claim 1 wherein each of the qubits in the first and the second sets of qubits have a respective major axis, the major axes of the qubits of the first set parallel with one another along at least a majority of a length thereof, and the major axes of the qubits of the second set parallel with one another along at least a majority of a length thereof, the major axes of the qubits of the second set of qubits nonparallel with the major axes of the qubits of the first set of qubits, and each qubit in the first set of qubits crosses at least one qubit in the second set of qubits, and wherein each coupling device is positioned proximate a respective point where a respective one of qubits in the first set of qubits crosses one of the qubits in the second set of qubits and provides controllable communicative coupling between the qubit in the first set of qubits and the respective qubit in the second set of qubits.

10. The computational system of claim 9 wherein the respective major axis of each qubit in the first set of qubits is perpendicular to the respective major axis of each qubit in the second set of qubits such that each qubit in the first set of qubits perpendicularly crosses at least one qubit in the second set of qubits.

11. The computational system of claim 9 wherein at least a portion of each qubit in the first set of qubits is carried in a first layer and at least a portion of each qubit in the second set of qubits is carried in a second layer, such that at each respective point where one of the qubits in the first set of qubits crosses one of the qubits in the second set of qubits, the respective qubit in the first set of qubits is in the first layer and the qubit in the second set of qubits is in the second layer, the second layer different than the first layer.

12. The computational system of claim 1 wherein the first set of qubits includes at least four qubits and the second set of qubits includes at least four qubits.

13. The computational system of claim 1 wherein the quantum processor comprises a multi-layered superconducting integrated circuit.

14. The computational system of claim 1, further comprising:
- a second readout subsystem responsive to a state of each of the qubits in the second set of qubits to generate a second set of detected samples, wherein each detected sample in the second set of detected samples represents a respective one of the qubits in the second set of qubits;
- where, in use, the at least one post-processing processor-based device:
  - receives the second set of detected samples that represents the qubits in the second set of qubits; and
  - processes the second set of detected samples to generate a second set of derived samples, wherein each derived sample in the second set of derived samples represents a respective one of the qubits in the first set of qubits.

15. The computational system of claim 1 wherein the at least one post-processing processor-based device:
- generates the derived samples that represent the second set of qubits by sampling the derived samples that represent the second set of qubits conditioned on the first set of detected samples that represents the qubits in the first set of qubits.

* * * * *